United States Patent
Ikegami et al.

(10) Patent No.: US 9,551,133 B2
(45) Date of Patent: Jan. 24, 2017

(54) STROKE OPERATION CALIBRATION CONTROL DEVICE FOR HYDRAULIC CYLINDER AND STROKE OPERATION CALIBRATION CONTROL METHOD FOR HYDRAULIC CYLINDER

(71) Applicant: Komatsu Ltd., Tokyo (JP)

(72) Inventors: Katsuhiro Ikegami, Hiratsuka (JP); Yoshiki Kami, Hadano (JP); Yuki Shimano, Hirakata (JP); Hayato Matsumoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 337 days.

(21) Appl. No.: 14/350,461

(22) PCT Filed: Apr. 12, 2013

(86) PCT No.: PCT/JP2013/061122
§ 371 (c)(1),
(2) Date: Apr. 8, 2014

(87) PCT Pub. No.: WO2014/167732
PCT Pub. Date: Oct. 16, 2014

(65) Prior Publication Data
US 2015/0299986 A1    Oct. 22, 2015

(51) Int. Cl.
*G01D 18/00*    (2006.01)
*E02F 9/22*    (2006.01)
(Continued)

(52) U.S. Cl.
CPC .............. *E02F 9/226* (2013.01); *E02F 3/435* (2013.01); *E02F 9/22* (2013.01); *E02F 9/2271* (2013.01);
(Continued)

(58) Field of Classification Search
CPC ....................................... E02F 9/226
(Continued)

(56) References Cited

U.S. PATENT DOCUMENTS 4,282,738 A * 8/1981 Kojima .................. B30B 15/18
72/389.3
7,124,045 B2  10/2006 Yamamoto et al.
(Continued)

FOREIGN PATENT DOCUMENTS

CN   100343620 C   10/2007
JP   2004-132137 A   4/2004
(Continued)

OTHER PUBLICATIONS

International Search Report and Written Opinion dated May 14, 2013, issued for PCT/JP2013/061122.
(Continued)

*Primary Examiner* — Sujoy Kundu
*Assistant Examiner* — Ricky Ngon
(74) *Attorney, Agent, or Firm* — Locke Lord LLP; James E. Armstrong, IV; Howard M. Gitten

(57) ABSTRACT

A stroke operation calibration control device for a hydraulic cylinder includes: movable portions; hydraulic cylinders; a stroke sensor measuring a stroke length of the hydraulic cylinder; a reset sensor measuring a reset reference point at which a measurement value of the stroke length obtained by the stroke sensor is reset; a stroke end detection process unit detecting a stroke end position of the hydraulic cylinder; a calibration process unit calibrating the measurement value of the stroke length upon the detection of the reset reference point and/or the stroke end position; a malfunction detection unit outputting an error when the stroke length is in the predetermined measurement range; and a control unit pro-
(Continued)

hibiting the reset until the stroke length has passed the reset reference point at power input time.

4 Claims, 20 Drawing Sheets

(51) Int. Cl.
    *E02F 3/43*     (2006.01)
    *E02F 9/26*     (2006.01)
    *F15B 19/00*     (2006.01)
    *G01D 5/14*     (2006.01)
    *F15B 15/28*     (2006.01)

(52) U.S. Cl.
    CPC .............. *E02F 9/2296* (2013.01); *E02F 9/26* (2013.01); *E02F 9/265* (2013.01); *F15B 15/2815* (2013.01); *F15B 19/002* (2013.01); *F15B 15/2807* (2013.01); *G01D 5/145* (2013.01); *G01D 18/00* (2013.01)

(58) Field of Classification Search
    USPC .......................................................... 702/85
    See application file for complete search history.

(56) References Cited

U.S. PATENT DOCUMENTS

| 2005/0273288 A1 | 12/2005 | Yamamoto et al. |
| 2009/0111655 A1* | 4/2009 | Hatanaka ................ B60T 17/02 |
| | | 477/218 |

FOREIGN PATENT DOCUMENTS

| JP | 2005-326302 A | 11/2005 |
| JP | 2006-226909 A | 8/2006 |
| JP | 2006-258730 A | 9/2006 |
| JP | 2010-174980 A | 8/2010 |

OTHER PUBLICATIONS

Office Action dated Nov. 30, 2016, issued by Examiner Dr. Lothar Hilgenfeld of the German Patent Office, in corresponding German Patent Application No. 11 2013 000 209.4.

* cited by examiner

STROKE OPERATION CALIBRATION CONTROL DEVICE FOR HYDRAULIC CYLINDER AND STROKE OPERATION CALIBRATION CONTROL METHOD FOR HYDRAULIC CYLINDER

FIELD

The present invention relates to a stroke operation calibration control device for a hydraulic cylinder, and a stroke operation calibration control method for a hydraulic cylinder.

BACKGROUND

An excavator as one working machine includes a running body, an upper swinging body that can swing on the running body, and an one machine on the upper swinging body. The operation machine includes a boom with one end pivotally supported on a base unit, an arm with one end pivotally supported by the other end of the boom, and an attachment pivotally supported by the other end of the arm. The boom, the arm, and the attachment are driven by hydraulic cylinders. For detecting the position and the posture of this operation machine, the stroke of the hydraulic cylinder is measured.

For example, Patent Literature 1 discloses an excavator having a position sensor that detects the position of the piston stroke of the hydraulic cylinder which drives the operation machine with the use of the rotation of a roller rolling on a cylinder rod. Since microscopic slide occurs between this roller and the cylinder rod, a measurement error is generated between the position of the actual stroke and the position of the stroke obtained from the detection result of the position sensor. In view of this, a magnetic sensor as a reset sensor is provided at a reference position on an outer surface of a cylinder tube of the hydraulic cylinder for calibrating the stroke position obtained from the detection result of the position sensor with the reference position. Every time the piston passes the reference position during the operation, the stroke position detected by the position sensor is calibrated, thereby enabling the correct position measurement.

CITATION LIST

Patent Literature

Patent Literature 1: Japanese Laid-open Patent Publication No. 2006-258730

SUMMARY

Technical Problem

The aforementioned hydraulic cylinder has a stroke sensor (position sensor) and a reset sensor for calibrating the measurement error of the stroke sensor, whereby the stroke length of the hydraulic cylinder is obtained with high accuracy. When the measurement error of the stroke sensor is large, it is determined that the error has occurred and this is notified by making sound from a buzzer, for example.

On the other hand, the working machine may have the operation machine in a stable posture in a state that power is lost and the stroke length is not detected. In this case, a large difference may be generated between the actual stroke length of the hydraulic cylinder and the measurement stroke length measured just before the power is lost. The large difference between the actual stroke length and the last measurement stroke length at the power input time may cause a buzzer to make sound because it is determined that the error has occurred, in which case the progress in the operation of the machine is interrupted.

The present invention has been made in view of the above, and an object is to provide a stroke operation calibration control device for a hydraulic cylinder and a stroke operation calibration control method for a hydraulic cylinder, which can prevent the false alarming in consideration of the state unique to the operation machine including the hydraulic cylinder.

Solution to Problem

To solve the problem described above and achieve the object, a stroke operation calibration control device for a hydraulic cylinder according to the present invention includes: movable portions sequentially supported rotatably to a vehicle main body; hydraulic cylinders each disposed between the vehicle main body and the movable portion or between the movable portions and rotatably supporting the movable portions; a stroke sensor provided for the hydraulic cylinder and measuring a stroke length of the hydraulic cylinder; a reset sensor measuring a reset reference point at which a measurement value of the stroke length obtained by the stroke sensor is reset; is stroke end detection process unit detecting a stroke end position of the hydraulic cylinder; a calibration process unit calibrating the measurement value of the stroke length upon the detection of the reset reference point and/or the stroke end position; a malfunction detection unit outputting an error when the stroke length is in the predetermined measurement range; and a control unit prohibiting the reset until the stroke length has passed the reset reference point at power input time.

Moreover, in the above-described stroke operation calibration control device for a hydraulic cylinder according to the present invention, the reset sensor is a rotary encoder, and an initial stroke value of the rotary encoder at power input time is set to a value in the predetermined measurement range.

Moreover, a stroke operation calibration control method for a hydraulic cylinder according to the present invention, includes, when a stroke length of a hydraulic cylinder is measured by a stroke sensor provided for the hydraulic cylinder, detecting a reset reference point by a reset sensor and calibrating the stroke length, wherein the reset is prohibited until the stroke length has passed the reset reference point at power input time.

Moreover, in the above-described stroke operation calibration control method for a hydraulic cylinder according to the present invention, the reset sensor is a rotary encoder, and an initial stroke value of the rotary encoder at the power input time is set to a value in a predetermined measurement range that is out of a stroke end range.

According to the present invention, since the reset is prohibited until the stroke length has passed the reset reference point at the power input time, the false alarming due to the state unique to the operation machine including the hydraulic cylinder can be prevented.

BRIEF DESCRIPTION OF DRAWINGS

FIG. 14-1 is a diagram depicting an example of the stroke initial calibration work support screen in the second embodiment, which is displayed in the display unit of the HMI monitor.

FIG. 14-2 is a diagram depicting an example of the stroke initial calibration work support screen in the second embodiment, which is displayed in the display unit of the HMI monitor.

FIG. 14-3 is a diagram depicting an example of the stroke initial calibration work support screen in the second embodiment, which is displayed in the display unit of the HMI monitor.

FIG. 14-4 is a diagram depicting an example of the stroke initial calibration work support screen in the second embodiment, which is displayed in the display unit of the HMI monitor.

FIG. 14-5 is a diagram depicting an example of the stroke initial calibration work support screen in the second embodiment, which is displayed in the display unit of the HMI monitor.

FIG. 14-6 is a diagram depicting an example of the stroke initial calibration work support screen in the second embodiment, which is displayed in the display unit of the HMI monitor.

FIG. 14-7 is a diagram depicting an example of the stroke initial calibration work support screen in the second embodiment, which is displayed in the display unit of the HMI monitor.

FIG. 14-8 is a diagram depicting an example of the stroke initial calibration work support screen in the second embodiment, which is displayed in the display unit of the HMI monitor.

FIG. 14-9 is a diagram depicting an example of the stroke initial calibration work support screen in the second embodiment, which is displayed in the display unit of the HMI monitor.

FIG. 14-10 is a diagram depicting an example of the stroke initial calibration work support screen in the second embodiment, which is displayed in the display unit of the HMI monitor.

DESCRIPTION OF EMBODIMENTS

Embodiments of the present invention will be hereinafter described with reference to the attached drawings. First, embodiments of the present invention are described. An excavator as an example of a working machine to which the concept of the present invention can be applied will be described below.

First Embodiment

[Overall Structure of Excavator]

Figure 1:
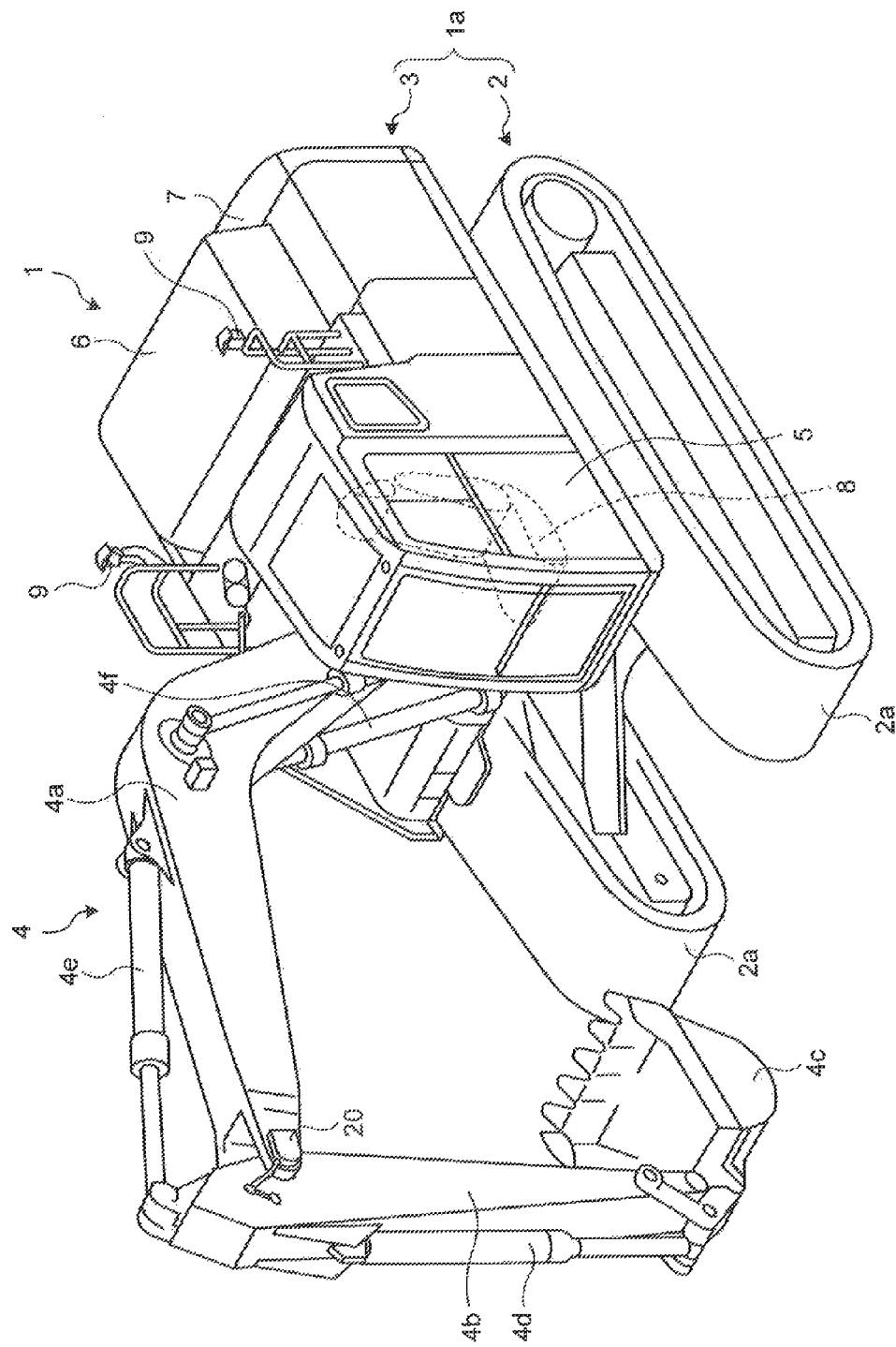
FIG. 1 is a perspective view depicting an overall structure of an excavator as an example of a working machine to which a hydraulic cylinder as an embodiment of the present invention is applied.

As depicted in FIG. 1, an excavator 1 includes a lower running body 2, an upper swinging body 3, and an operation machine 4. The lower running body 2 is configured to be able to run on its own by having a pair of right and left caterpillar tracks 2a rotate. The upper swinging body 3 is installed on the lower running body 2 so as to be able to swing freely. The operation machine 4 is pivotally supported on the front side of the upper swinging body 3 so as to be able to move up and down freely. The operation machine 4 includes a boom 4a, an arm 4b, a bucket 4c as an example of the attachment, and hydraulic cylinders (bucket cylinder 4d, arm cylinder 4e, boom cylinder 4f).

A vehicle main body 1a is mainly composed of the lower running body 2 and the upper swinging body 3. The upper swinging body 3 has a cab 5 on the anterior left side (front side of the vehicle), and an engine room 6 housing an engine and a counter weight 7 in the rear side (rear side of the vehicle). Inside the cab 5, a driver's seat 8 is prepared for an operator to sit on. A plurality of antennas 9 is installed on the right and left sides of the upper surface in the rear side of the upper swinging body 3. Note that in the first embodiment, the front, rear, right, and left directions of the vehicle are based on the operator sitting on the driver's seat 8 in the cab 5.

The boom 4a, the arm 4b, and the bucket 4c are rotatably supported in this order relative to the vehicle main body 1a, and the boom 4a, the arm 4b, and the bucket 4c correspond to movable portions relative to the vehicle main body 1a, the boom 4a, and the arm 4b, respectively.

The boom 4a is provided with a rotary encoder 20. The rotary encoder 20 is also attached to the vehicle main body as described later. The rotation of the arm 4b relative to the boom 4a is transmitted to the rotary encoder 20 attached to the boom 4a via a lever pivotally supported by the arm 4b. The rotary encoder 20 outputs a pulse signal according to the rotating angle of the arm 4b. The rotation of the boom 4a relative to the vehicle main body 1a is transmitted to the rotary encoder 20 attached to the vehicle main body is via a lever pivotally supported by the boom 4a. The rotary encoder 20 outputs a pulse signal according to the rotating angle of the boom 4a.

[Circuit Structure of Excavator]

Figure 2:
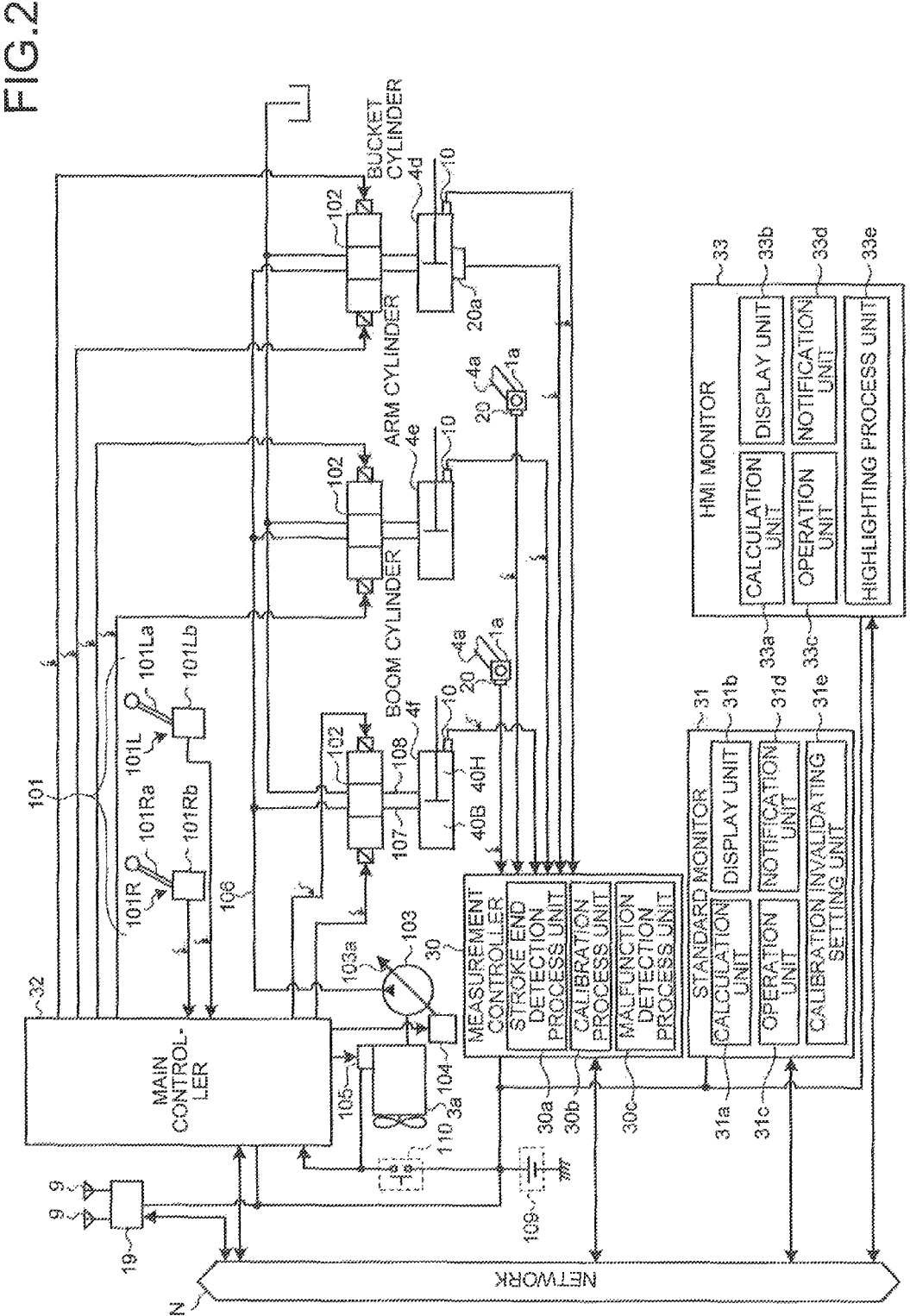
FIG. 2 is a block diagram depicting an overall circuit structure of the excavator including the stroke operation diagnosis supporting device for the hydraulic cylinder depicted in FIG. 1.

A hydraulic circuit of the excavator 1 is described with reference to FIG. 1 and FIG. 2. FIG. 2 is a block diagram depicting an overall circuit structure of the excavator including a stroke operation diagnosis supporting device for the hydraulic cylinder depicted in FIG. 1. Of the hydraulic cylinders, the boom cylinder is described below. Although not described, the similar operation diagnosis is carried out with respect to the other cylinders: the arm cylinder 4e and the bucket cylinder 4d. In FIG. 2, an electric signal is input from an electrical operation lever device 101 to a main controller 32. Then, a control electric signal from the main controller 32 is supplied to a control valve 102 of the boom cylinder 4f, thereby driving the boom cylinder 4f.

As depicted in FIG. 1, the operation machine 4 is provided with the boom 4a, the arm 4b and the bucket 4c, and by driving the boom cylinder 4f, the arm cylinder 4e, and the bucket cylinder 4d for dealing with those above, the boom 4a, the arm 4b and the bucket 4c are operated, respectively.

The boom cylinder 4f is driven by using, for example, a variable displacement hydraulic pump 103 as a drive source. The hydraulic pump 103 is driven by an engine 3a. A swash plate 103a of the hydraulic pump 103 is driven by a servo mechanism 104. The servo mechanism 104 operates in response to the control signal (electric signal) output from the main controller 32, so that the awash plate 103a of the hydraulic pump 103 comes to the Position determined by the control signal. An engine driving mechanism 105 of the engine 3a operates in response to the control signal (electric signal) output from the main controller 32, so that the engine 3a rotates based on the engine speed determined by the control signal.

An outlet of the hydraulic pump 103 is connected to the control valve 102 via a discharge oil passage 106. The control valve 102 is connected to a cap-side oil chamber 40B and a rod-side oil chamber 40H of the boom cylinder 4f via oil passages 107 and 108, respectively. The operation oil discharged from the hydraulic pump 103 is supplied to the control valve 102 via the discharge oil passage 106. The operation oil having passed through the control valve 102 is supplied to the cap-side oil chamber 40B and the rod-side oil chamber 40H of the boom cylinder 4f via the it passages 107 and 108.

The boom cylinder 4f is provided with a stroke sensor 10. The stroke sensor 10 measures the strokes of the piston. A portion of the vehicle main body 1a that pivotally supports one end of the boom 4a is provided with the rotary encoder 20 that functions as the reset sensor. The rotary encoder 20 detects the rotating angle of the boom 4a and outputs the pulse signal according to the rotating angle. The stroke sensor 10 and the rotary encoder 20 are connected to a measurement controller 30.

A battery 109 is a power source that activates the main controller 32. The measurement controller 30, a standard monitor 31, and an HMI (Human Machine Interface) monitor 33 as a guidance monitor for computerized construction are electrically connected to the battery 109. The main controller 32 is electrically connected to the battery 109 via an engine key switch 110.

When the engine key switch 110 is turned on, the battery 109 is electrically connected to a motor (not illustrated) for starting the engine 3a, thereby starting the engine 3a. At the same time, the battery 109 is electrically connected to the main controller 32, thereby activating the main controller 32. When the engine key switch 110 is turned off, the battery 109 as electrically disconnected from the main controller 32, thereby stopping the engine 3a and stopping the activation of the main controller 32.

The main controller 32, the measurement controller 30, the standard monitor 31, the HMI monitor 33, and a position information detection device 19 are mutually connected via an in-vehicle network N. A switch state signal representing the switch state (on or off) of the engine key switch 110 is input from the main controller 32 to the measurement controller 30, the standard monitor 31, and the HMI monitor 33 via the network N. While the switch state signals to be input to the measurement controller 30, the standard monitor 31, and the HMI monitor 33 are on, the measurement controller 30, the standard monitor 31, and the HMI monitor 33 are in the activated state; when the switch state signals are turned off, the measurement controller 30, the standard monitor 31, and the HMI monitor 33 are stopped.

Operation lever devices 101R and 101L have in the cab 5, for example, operation levers 101Ra and 101La, and detection units 101Rb and 101Lb for detecting operation signals that represent the direction and amount of operating the operation levers 101Ra and 101La. The operation signals detected in the detection units 101Rb and 101Lb are input to the main controller 32. The control valve 102 is connected to the main controller 32 via an electric signal line. Note that the operation lever devices 101R and 101L constitute a pair of right and left levers. The operation lever device 101R operates the boom 4a and the bucket 4c, while the operation lever device 101L operates the arm 4b and the swing of the upper swinging body 3. Note that the swing actuator of the upper swinging body 3 is not illustrated.

Here, for example, upon the operation of the operation lever 101Ra, the operation signal of the operation lever 101Ra is input to the main controller 32 and the control signal for operating the control valve 102 is generated in the main controller 32. This control signal is supplied from the main controller 32 to the control valve 102 via the electric signal line, and the valve position of the control valve 102 is changed.

[Structure of Stroke Operation Diagnosis Supporting Device for Hydraulic Cylinder]

Subsequently, the stroke operation diagnosis supporting device for the hydraulic cylinder is described. The stroke operation diagnosis supporting device for the hydraulic cylinder includes the hydraulic cylinders (bucket cylinder 4d, arm cylinder 4e, boom cylinder 4f), the measurement controller 30, the standard monitor 31, the HMI monitor 33, and the main controller 32.

The arm cylinder 4e and the boom cylinder 4f are each provided with the stroke sensor 10 that detects the amount of stroke of the hydraulic cylinder as the rotation amount. The bucket cylinder 4d is provided with the stroke sensor 10 and a magnetic sensor 20a.

The portions that support the rotation shafts of the arm 4b and the boom 4a are each provided with the rotary encoder 20 that outputs the pulse signal according to the rotation amount (angle) of the arm 4b and the boom 4a. This pulse signal is a rectangular wave.

The stroke sensor 10, the rotary encoder 20, and the magnetic sensor 20a are electrically connected to the measurement controller 30. The measurement controller 30 has a calibration process unit 30b. The calibration process unit 30b calibrates the stroke lengths measured by the stroke sensors 10 of the bucket cylinder 4d, the arm cylinder 4e, and the boom cylinder 4f on the basis of the detection signals of the stroke sensor 10, the rotary encoder 20, and the magnetic sensor 20a. In other words, the stroke lengths measured by the stroke sensors 10 of the bucket cylinder 4d and the arm cylinder 4e are calibrated based on the measurement results of the corresponding rotary encoder 20. The stroke length measured by the stroke sensor 10 of the bucket cylinder 4d is calibrated based on the measurement results of the magnetic sensor 20a that functions as the reset sensor. Note that the measurement controller 30 calculates the position and posture of the bucket 4c on the basis of the measured stroke length of each hydraulic cylinder.

The measurement controller 30 has a stroke end detection process unit 30a. The stroke end detection process unit 30a detects whether the piston has reached the stroke end, i.e., the maximum stroke position or the minimum stroke position. The stroke end detection process unit 30a determines that the piston has reached the stroke end when the following three conditions are satisfied; the operation levers 101Ra and 101La are in operation; the stroke position measured by the stroke sensor 10 is within, for example, 3 mm from the preset stroke end position; and the moving speed of the piston is less than or equal to the microscopic moving amount, for example, ±3 mm/sec. Note that the moving speed of the piston is obtained by differentiating by time the stroke position detected by the stroke sensor 10. Whether the piston has reached the stroke end or not may be determined under the condition that the state is the relief state in which the discharging pressure of the hydraulic pump 103 is more than the predetermined pressure. In addition to resetting the stroke length by the magnetic sensor 20a and the rotary encoder 20 as the reset sensor, the calibration process unit 30b resets the stroke length also when the piston has reached the stroke end.

Moreover, the measurement controller 30 includes a malfunction detection process unit 30c. The malfunction detection process unit 30c outputs an error to notify the abnormality of the stroke when the measured stroke length has exceeded a predetermined value that is more than the stroke range defined by the minimum stroke end position and the maximum stroke end position.

The standard monitor 31 includes a calculation unit 31a, a display unit 31b, an operation unit 31c, a notification unit 31d, and a calibration invalidating setting unit 31e. The calculation unit 31a acquires various pieces of information through communication with the main controller 32 or the measurement controller 30, displays the acquired information on a display screen of the display unit 31b, and outputs various instruction information input from the operation unit 31c to the display unit 31b and another controller, etc. The notification unit 31d is composed of, for example, a buzzer, and outputs sound or the like to the outside if warning is necessary to notify an error. The calibration invalidating setting unit 31e sets the validity/invalidity of the reset process by the reset sensor as later described. Note that the display unit 31b may be a touch panel that also serves as the operation unit 31c.

The HMI monitor 33 includes a calculation unit 33a, a display unit 33b, an operation unit 33c, a notification unit 33d, and a highlighting process unit 33e. The calculation unit 33a acquires various pieces of information through communication with the main controller 32 or the measurement controller 30, displays the acquired information on a display screen of the display unit 33b, and outputs various instruction information input from the operation unit 33c to the display unit 33b and another controller, etc. The notification unit 33d is composed of, for example, a buzzer, and outputs sound or the like to the outside if warning is necessary to notify an error. The HMI monitor 33 is composed of a touch panel where the display unit 33b also serves as the operation unit 33c, but the display unit 33b and the operation unit 33c may be provided separately. The HMI monitor 13 transits the stroke initial work supporting screen, which is described later, and supports the initial calibration work. Note that the position information detection device 19 calculates the position and the direction of the excavator 1 on the basis of the position information acquired via the antennas 9 and transmits the result to the main controller 32 and the HMI monitor 33, thereby enabling the computerized construction.

[Arrangement and Operation of Stroke Sensor]

Next, the stroke sensor 10 is described with reference to FIG. 3 and FIG. 4. Here, the stroke sensor 10 attached to the boom cylinder 4f is described for the convenience of the description; however, this also applies to the similar stroke sensor 10 attached to the arm cylinder 4e.

Figure 3:
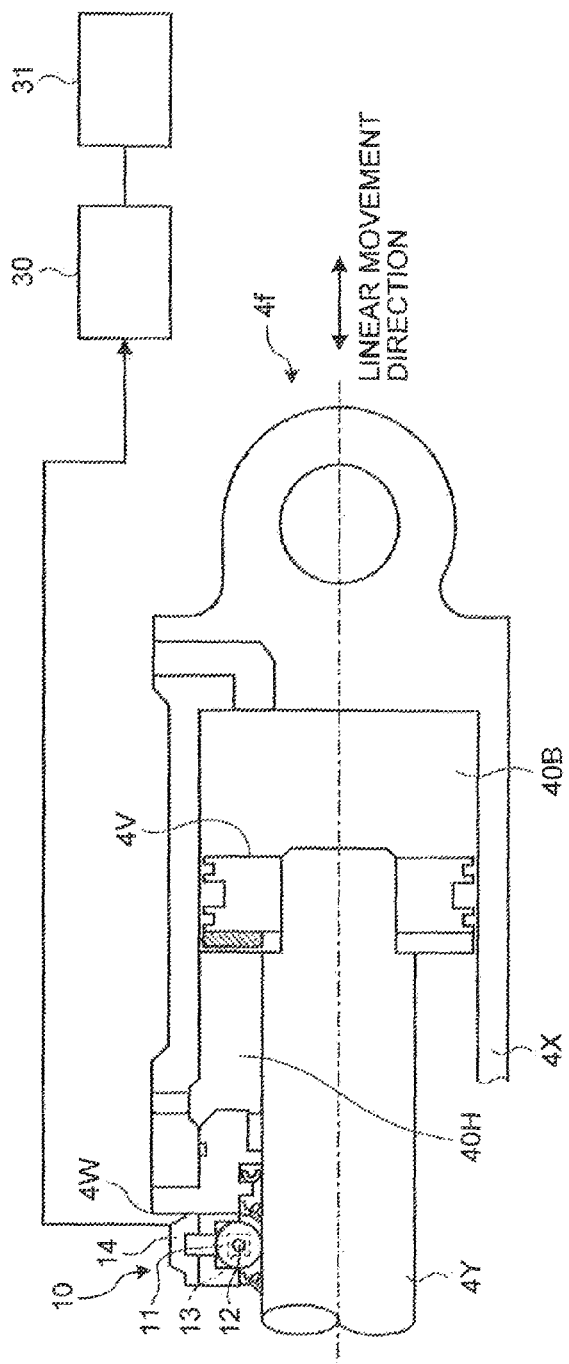
FIG. 3 is a schematic view depicting the arrangement of a stroke sensor relative to the hydraulic cylinder.

As depicted in FIG. 3, the boom cylinder 4f includes a cylinder tube 4X, and a cylinder rod 4Y that can be moved relative to the cylinder tube 4X in the cylinder tube 4X. The cylinder tube 4X is provided with a piston 4V in a manner that the piston 4V can freely slide. The piston 4V is provided with the cylinder rod 4Y. The cylinder rod 4Y is provided for a cylinder head 4W in a manner that the cylinder rod 4Y can freely slide. A chamber defined by the cylinder head 4W, the piston 4V, and the cylinder inner wall corresponds to the rod-side oil chamber 40H. An oil chamber on the opposite side of the rod-side oil chamber 40H via the piston 4V corresponds to the cap-side oil chamber 40B. Note that the cylinder head 4W is provided with a sealing member for sealing the space between the cylinder head 4W and the cylinder rod 4Y, thereby preventing dust or the like from entering the rod-side oil chamber 40H.

The cylinder rod 4Y contracts when the operation oil is supplied to the rod-side oil chamber 40H and the oil is discharged out of the cap-side oil chamber 40B. Moreover, the cylinder rod 4Y extends when the operation oil is discharged out of the rod-side oil chamber 40H and the oil is supplied to the cap-side oil chamber 40B. In other words, the cylinder rod 4Y moves linearly in the right-left direction in the drawing.

The place outside the rod-side oil chamber 40H that is in close contact with the cylinder head 4W is provided with a case 14 that covers the stroke sensor 10 and houses the stroke sensor 10 inside. The case 14 is fastened with a bolt or the like to the cylinder head 4W, thereby being fixed to the cylinder head 4W.

The stroke sensor 10 includes a rotary roller 11, a rotation center shaft 12, and a rotation sensor unit 13. The rotary roller 11 has its surface in contact with a surface of the cylinder rod 4Y and freely rotates following the linear movement of the cylinder rod 4Y. In other words, the rotary roller 11 converts the linear movement of the cylinder rod 4Y into the rotatory movement. The rotation center shaft 12 is disposed orthogonal to the linear movement direction of the cylinder rod 4Y.

The rotation sensor unit 13 is configured to be able to detect the rotation amount (rotating angle) of the rotary roller 11 as electric signals. The signal that represents the rotation amount (rotating angle) of the rotary roller 11 detected by the rotation sensor unit 13 is sent to the measurement controller 30 via the electric signal line, and converted into the position (stroke position) of the cylinder rod 4Y of the boom cylinder 4f in the measurement controller 30.

Figure 4:
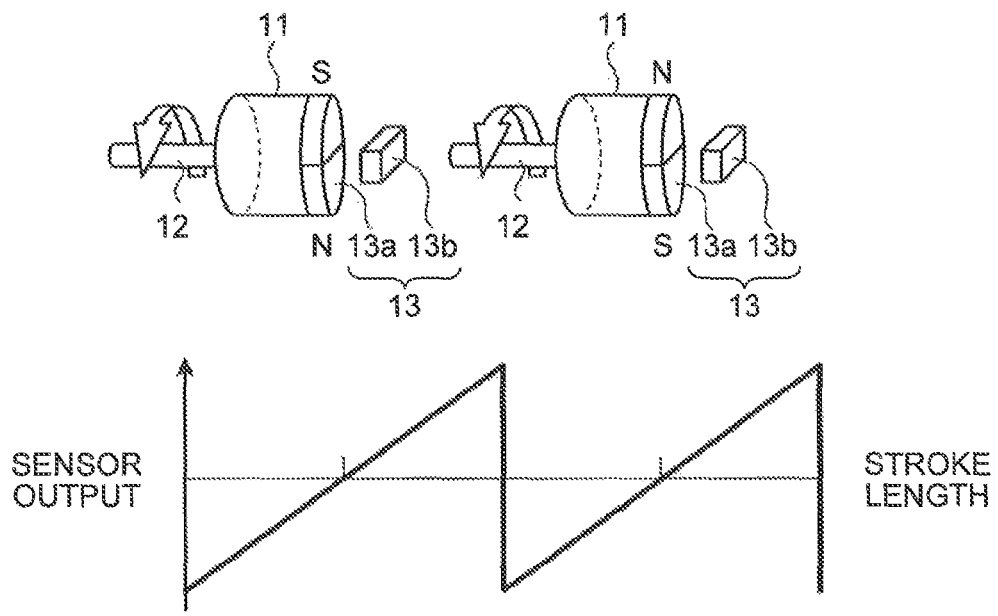
FIG. 4 is a schematic view depicting the outline of the stroke sensor and its operation.

As depicted in FIG. 4, the rotation sensor unit 13 includes a magnet 13a and a Hall IC 13b. The magnet 13a as a detection medium is attached to the rotary roller 11 so as to be rotated together with the rotary roller 11. The magnet 13a rotates following the rotation of the rotary roller 11 around the rotation center shaft 12. The magnet 13a is configured so that the N-pole and the S-pole are alternately changed according to the rotating angle of the rotary roller 11. The magnet 13a is configured so that the magnetic force (magnetic flux density) detected in the Hall IC 13b periodically changes assuming that one rotation of the rotary roller 11 is one period.

The Hall IC 13b is a magnetic sensor that detects the magnetic force (magnetic flux density) generated by the magnet 13a as the electric signal. The Hall IC 13b is provided apart from the magnet 13a by a predetermined distance along the axial direction of the rotation center shaft 12.

The electric signal detected in the Hall IC 13b is sent to the measurement controller 30 and is converted into the rotation amount of the rotary roller 11, i.e., the displacement amount (stroke length) of the cylinder rod 4Y of the boom cylinder 4f. Specifically, the displacement amount by which the cylinder rod 4Y is moved linearly when the rotary roller 11 rotates once is calculated as 2πd where d is the radius of rotation of the rotary roller 11.

Here, the relation between the rotating angle of the rotary roller 11 and the electric signal (voltage) detected in the Hall IC 13b is described with reference to FIG. 4. When the rotary roller 11 rotates to rotate the magnet 13a, the magnetic force (magnetic flux density) that transmits through the Hall IC 13b periodically changes according to the rotating angle, thereby periodically changing the electric signal (voltage) as the sensor output. The rotating angle of the rotary roller 11 can be measured based on the level of the voltage output from the Hall IC 13b.

Moreover, the engine speed of the rotary roller 11 can be measured by counting the number of repetitions of the period of the electric signal (voltage) output from the Hall IC 13b. Then, based on the rotating angle of the rotary roller 11 and the engine speed of the rotary roller 11, the displacement amount (stroke length) of the cylinder rod 41 of the boom cylinder 4f is measured.

[Operation of Rotary Encoder]

Figure 5:
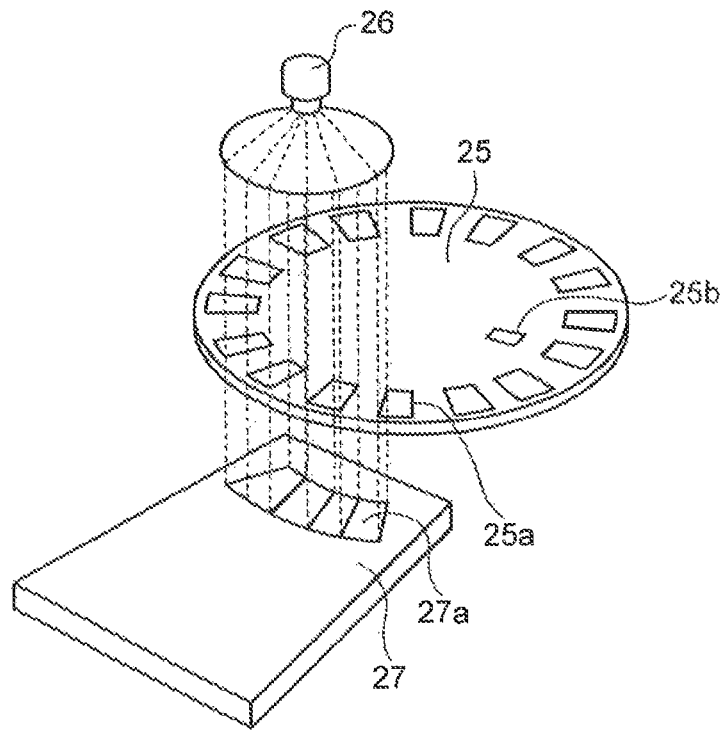
FIG. 5 is a schematic view depicting the outline of a rotary encoder as a reset sensor.

As depicted in FIG. 5, the rotary encoder 20 includes a disk-shaped portion 25, a light emission unit 26, and a light reception unit 27. The light emission unit 26 and the light reception unit 27 are disposed to have the disk-shaped portion 25 interposed therebetween. The light emission unit 26 has a light-emitting element that emits light toward the light reception unit 27. The reception unit 27 has four light reception elements 27a that can receive the light emitted from the light emission unit 26. The four light reception elements 27a have the same width W, and are arranged in an arc-like manner serially and continuously. The light reception element 27a converts the amount of received light into the electric signal. The disk-shaped portion 25 is provided with a plurality of first transmission portions 25a that transmit the light emitted from the light emission unit 26 toward the light reception unit 27. The first transmission portions 25a are each the approximately rectangular slit whose circumferential width is 2 W and which extends in the radial direction, and are disposed at intervals of 2 W in an annular shape near the outer periphery of the disk-shaped portion 25 in parallel to the outer periphery thereof. The inner periphery of the circle formed by the first transmission portions 25a is provided with a single transmission portion 25b. The transmission portion 25b is an approximately rectangular slit extending radially.

The disk-shaped portion 25 rotates in synchronization with the rotation of the boom 4a relative to the vehicle main body 1a. The four light reception elements 27a output the electric signals in accordance with the amount of light having transmitted through the first and second transmission portions 25a and 25b by the rotation of the disk-shaped portion 25. Out of the electrical signals output from the serially provided light reception elements 27a in accordance with the amount of light having transmitted through the first and second transmission portions 25a and 25b, the electric signals output from the first and third light reception elements 27a and the electric signals output from the second and fourth light reception elements 27a are converted into the pulse signals. The light reception unit 27 outputs the converted pulse signal to the measurement controller 30. The generation of one pulse signal utilizes the electric signals from the two light reception elements 27a for the purpose of increasing the robustness of the sensor with respect to the external light and the like.

Moreover, upon the output of the electric signal from the light reception element 27a on the basis of the light having transmitted through the transmission portion 25b, the light reception unit 27 outputs the corresponding pulse signal. In other words, the light reception unit 27 outputs the three pulse signals generated according so the rotating angle of the disk-shaped portion 25. The rotating angle of the disk-shaped portion 25 is the same as the rotating angle of the boom 4a; therefore, the pulse signal is output in accordance with the rotating angle of the boom cylinder 4f.

Specifically, the rotary encoder 20 is of incremental type, and is configured to be able to output an A-phase pulse signal, a B-phase pulse signal whose phase is different from that of the A-phase by 90°, and a Z-phase pulse signal (reference pulse signal) that is generated once when the light has passed through the transmission portion 25b by one rotation of the disk-shaped portion 25. The measurement controller 30 counts the change of rise and fall of the A-phase and B-phase pulse signals. The counted number is in proportion of the rotation amount of the boom cylinder 4f. The measurement controller 30 determines the rotating direction of the boom 4a from the difference in phase between the A phase and the B phase. Moreover, the reference position of the rotation of the boom 4a is measured based on the Z-phase pulse signal, and the counted number is cleared. The approximate center in the rotatable angle range for the boom 4a is set as the reference position. The measurement controller 30 monitors the count value of the rotary encoder 20, and stores an arbitrary number of stokes for every predetermined count value, and stores the average value thereof as the reset reference point (intermediate reset position) as the set reference position. The phase pulse signal is output when the light having transmitted through the transmission portion 25a corresponding to the Z phase is blocked by the disk-shaped portion 25. In other words, the Z-phase pulse signal is detected when the pulse signal has fallen.

The rotary encoder 20 outputs the Z-phase pulse signal at an angle of the approximate center of the rotatable angle range for the boom 4a. In other words, the rotary encoder 20 outputs the Z-phase pulse signal in the approximate center of the stroke range for the boom cylinder 4f. In the first embodiment, the intermediate reset position of the rotary encoder 20 is as described above; alternatively, the intermediate reset position may be any other position than the stroke end of the hydraulic cylinder.

[Measurement and Calibration of Stroke Length by Measurement Controller]

Figure 6:
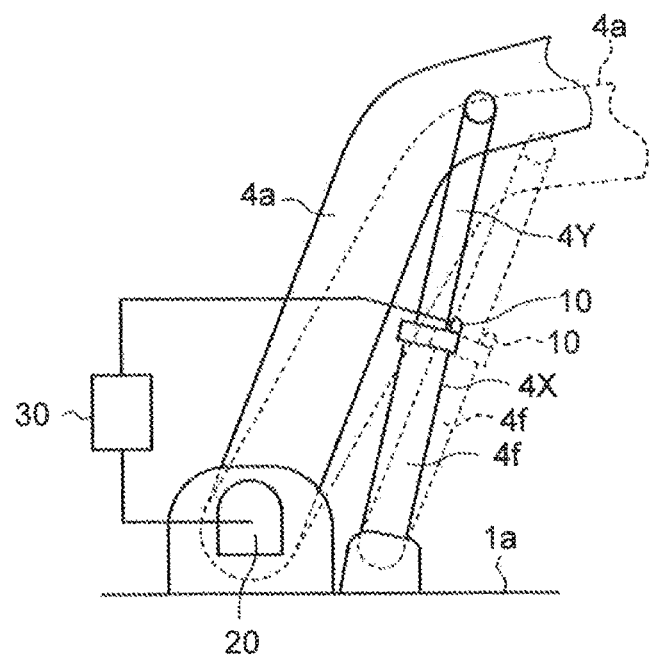
FIG. 6 is a schematic view depicting the state in which the boom of the excavator is moved up and down.

Next, description is made of the measurement and calibration of the stroke length by the measurement controller 30. Here, as an example, the measurement and calibration of the stroke length when the boom 4a is moved up and down are described. As depicted in FIG. 6 the boom 4a is moved up and down along with the extension and contraction of the boom cylinder 4f. The boom cylinder 4f reaches the stroke end on the extension side when the boom 4a has moved up to the maximum, and reaches the stroke end on the contraction side when the boom 4a has moved down to the maximum. The stroke length of the boom cylinder 4f on this occasion is measured based on the rotation amount of the rotary roller 11 of the stroke sensor 10.

Here, microscopic slide inevitably occurs between the cylinder rod 4Y and the rotary roller 11 of the stroke sensor 10. In particular, large-scaled slide occurs upon the impact between the piston 4V and the cylinder tube 4X at the stroke end position or the impact on the cylinder rod 4Y during the work. This slide causes an error (accumulated error due to slide) between the actual position of the cylinder rod 4Y and the stroke measurement position of the cylinder rod 4Y obtained from the detection result of the stroke sensor 10. In order to calibrate the stroke measurement value of obtained from the detection result of the stroke sensor 10, the rotary encoder 20 as the reset sensor is provided. The rotary roller 11 and the rotary encoder 20 are connected to the measurement controller 30, and the measurement controller 30 calibrates the stroke length measured by the stroke sensor 10 on the basis of the pulse signal output from the rotary encoder 20.

As depicted in FIG. 6, the boom 4a is moved up by the extension of the boom cylinder 4f. The stroke length of the boom cylinder 4f on this occasion is measured by the stroke sensor 10. Meanwhile, in the rotary encoder 20, the disk-shaped portion 25 rotates when the boom 4a is rotated relative to the vehicle main body 1a due to the upward movement of the boom 4a. On this occasion, the light emitted from the light emission unit 26 and transmitted through the transmission portions 25a and 25b of this disk-shaped portion 25 is received in the light reception unit 27. Thus, the pulse signal according to the rotating angle of the disk-shaped portion 25 is output from the light reception unit 27. The light reception unit 27 outputs the A-phase, B-phase, and Z-phase pulse signals. The Z-phase pulse signal is associated with she reference angle, which is the predetermined rotating angle of the boom 4a, and is output when the boom 4a comes to the reference angle.

Figure 7:
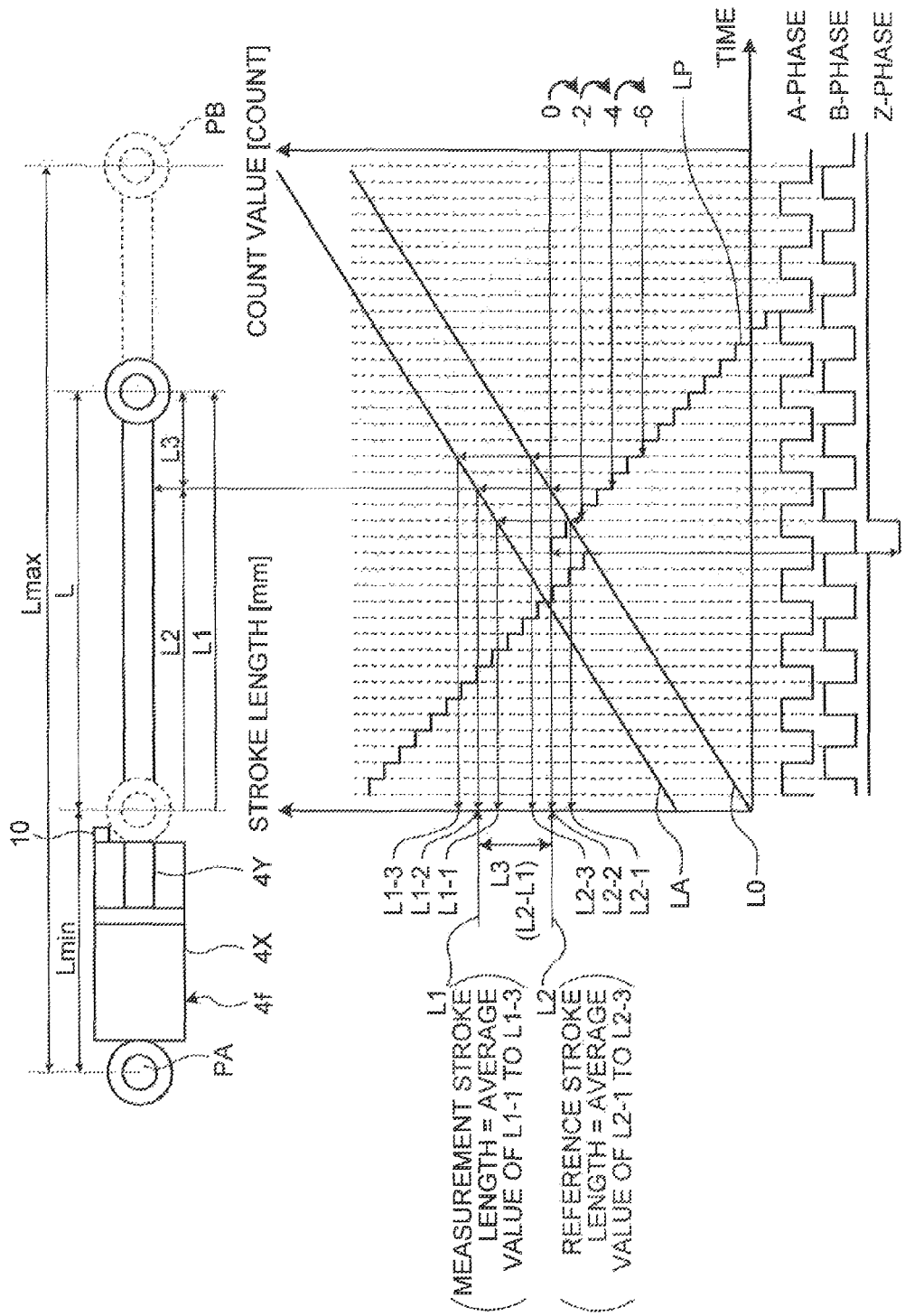
FIG. 7 is a schematic view for describing the stroke length of the hydraulic cylinder and a process of calibrating the stroke length.

Here, as depicted in FIG. 7, the measurement controller 30 stores the reference stroke length L2 at the time of the initial calibration. Here, the initial calibration refers to the calculation and the storage of the reference stroke length L2 when the excavator 1 is shipped from the factory or when the rotary encoder 20 or the magnetic sensor 20a as the reset sensor is replaced by a new one. At the initial calibration, the measurement controller 30 first detects the fall of the Z-phase pulse, stores the stroke lengths L2-1 to L2-3 of boom cylinder 4f corresponding to a predetermined integer number of times of count values of the rotary encoder 20 (here, three times, for every multiple of −2) and stores the average value thereof as the reference stroke length L2. Note that in FIG. 7, L0 represents the change of the stroke length at the initial, calibration, LA represents the change of the stroke length at other than the initial calibration, and LP represents the change of the count value of the rotary encoder 20.

On the other hand, the measurement controller 30 detects the extension of the stroke lengths L1-1 to L1-3 of boom cylinder 4f corresponding to a predetermined integer number of times of count values of the rotary encoder 20 (here, three times, for every multiple of 2) when the Z-phase pulse signal is detected in the general operation process of the boom cylinder 4f. The measurement controller 30 stores the stroke lengths L1-1 to L1-3 that are measured by the predetermined number of times, and stores the average value thereof as the measurement stroke length L1.

As described above, the measurement controller 30 stores the reference stroke length 12 corresponding to the predetermined number of times of count values of the rotary encoder 20 that are calculated and stored by the initial calibration. The measurement controller 30 calculates the difference L3 between the measurement stroke length L1 detected during the normal operation at other than the initial calibration and the reference stroke length L2 detected at the initial calibration.

Then, the measurement controller 30 calibrates the measurement value of the stroke sensor 10 using the difference L3 when the Z-phase pulse signal is detected, the stroke length is measured by the normal operation of the boom cylinder 4f and then the boom 4a is stopped.

In other words, after having detected the reach of the boom 4a at the rotating angle as the reference on the basis of the fall of the Z-phase of the rotary encoder 20, the measurement controller 30 detects the further rotation by the predetermined angle from that rotating angle, stores a predetermined number of stroke lengths of the boom cylinder 4f during that rotation, and then stores the average value thereof (measurement stroke length L1). Moreover, the measured measurement stroke length L1 and the reference stroke length 12 as the reference that is stored in advance in the initial calibration are compared to calculate the deviation (difference L3). Then, when the boom 4a stops, the calibration process is carried out in which the deviation is taken into the measurement value.

[Calibration of Magnetic Sensor and Calibration of Stroke Length]

The bucket cylinder 4d is more often exposed to water or sands than the boom cylinder 4f and the arm cylinder 4e, whereby the rotary encoder 20 cannot be attached to the bucket cylinder 4d. Therefore, as described above, the magnetic sensor 20a as the reset sensor is attached to the outer periphery of the cylinder tube 4X for the bucket cylinder 4d, and calibration is carried out in which the stroke position obtained from the detection result of the stroke sensor 10 is reset to the intermediate reset position (origin position).

Figure 8:
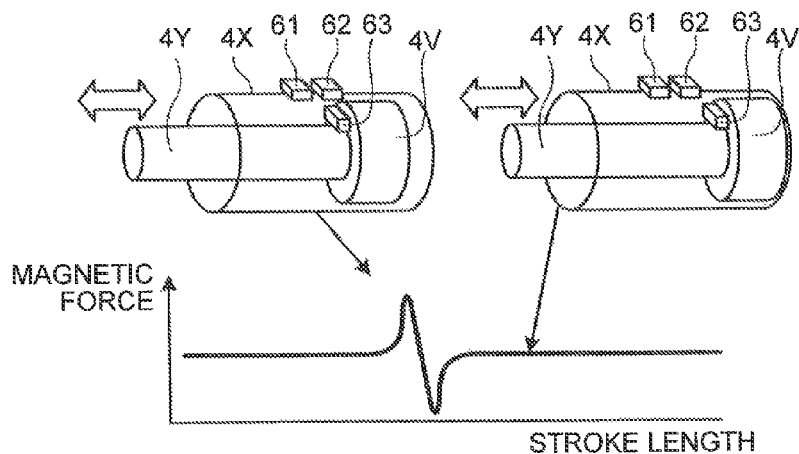
FIG. 8 is a schematic view depicting the outline of a magnetic sensor as a reset sensor and its operation.

As depicted in FIG. 8, the magnetic sensor 20a is attached to the outside of the cylinder tube 4X. The magnetic sensor 20a has two magnetic sensors 61 and 62 disposed apart from each other by a predetermined distance along the direction where the piston 4V linearly moves. The magnetic sensors 61 and 62 are provided a known intermediate reset positions (origin position). The piston 4V is provided with a magnet 63 that generates lines of magnetic force. The magnetic sensors 61 and 62 detect the magnetic force (magnetic flux density) through the lines of magnetic force generated by the magnet 63, and output the electric signal (voltage) according to the magnetic force (magnetic flux density). The signals detected in the magnetic sensors 61 and 62 are sent to the measurement controller 30. This measurement controller 30 calibrates to reset the stroke position obtained from the detection result of the stroke sensor 10 to the intermediate reset position (origin position) on the basis of the change of the detection results of the magnetic sensors 61 and 62. This calibration is the same as the calibration of the rotary encoder 20.

[Calibration Prohibition Process Control at Power Input Time]

Incidentally, the stroke length may change due to the own weight of the operation machine unless the operation machine is set in the stable posture in the state that the power is lost in the machine with no stroke length detected (in the state that no power is supplied to the main controller 32). In this case, the deviation occurs between the actual stroke length of the hydraulic cylinder and the measured stroke length that is measured just after the loss of power. Here, the deviation between the actual stroke length and the latest measured stroke length at the power input time would produce an alert from the buzzer or the like because the malfunction detection process unit 30c considers the error has occurred, in which case the progress in the operation of the machine is interrupted.

For this reason, at the power input time, the measurement controller 30 controls to prohibit the calibration process for the stroke length until the stroke length passes the intermediate reset position of the reset sensor and is reset. In other words, the deviation between the actual stroke length and the measured stroke length is allowed and the error is not notified until the stroke length has passed the intermediate reset position of the reset sensor.

Here, the procedure of the process of the calibration prohibition process control at the power input time is described with reference to FIG. 9. First, the measurement controller 30 determines whether power is input or not (Step S101). Upon the input of power (Yes in Step S101), the initial stroke length (the initial count value by the rotary encoder 20) is set to the value out of the measurement range (Step S102). After that, the measurement controller 30 determines whether the stroke length has passed the intermediate reset position (Step S103). If the stroke length has not passed the intermediate reset position (No in Step S103), error output of the malfunction detection process unit 30c is not performed even though the stroke length is out of the measurement range (Step S104), and the process of determining in Step S103 is repeated. On the other hand, if the stroke length has passed the intermediate reset position (Yes in Step S103), whether the measurement stroke length (count value) is out of the measurement range or not is determined (Step S105). If the measurement stroke length is out of the measurement range (Yes in Step S105), for example, the error output of the notification unit 31d is carried out (Step S106) and the process of determining in Step S105 is repeated. On the other hand, if the measurement stroke length is not out of the measurement range (No in Step S105), the process of determining is repeated.

[Initial Value Setting for Rotary Encoder at Power Input Time]

The measurement controller 30 stores the predetermined number of times of strokes for on the basis of the count values by the A-phase, the B-phase, and the Z-phase of the rotary encoder 20, and calculates the reference stroke length L2 and the measurement stroke length L1 from the average value of the strokes. However, whether the count value of the measurement controller 30 just after the power input is correct or not is not known until the Z-phase is passed and the value is cleared. Therefore, the stroke calibration is necessary using the count value after the Z-phase of the rotary encoder 20 just after the power input to the measurement controller 30. Specifically, the measurement controller 30 stores the initial count value of the rotary encoder 20 at the power input. When the count value of the measurement range of the rotary encoder 20 is ±3000, this initial count value is set to a large value of, for example, 9000.

As a result, the initial count value of the rotary encoder 20 is large at the power input time and the deviation between the actual stroke length and the measurement stroke length corresponding to the initial count value is large until the stroke length has passed the reset reference point of the rotary encoder 20. However, since the aforementioned calibration prohibition process control at the power input is performed, the alert of the error is not issued.

[Reset Invalidating Setting for Rotary Encoder]

In the case where the calibration invalidating setting unit 31e displays "OFF" for invalidating the reset, the calibration process unit 30b does not reset the rotary encoder 20 because the calibration process is invalid.

[Stroke Operation Diagnosis Support Screen on Standard Monitor]

Figure 10:
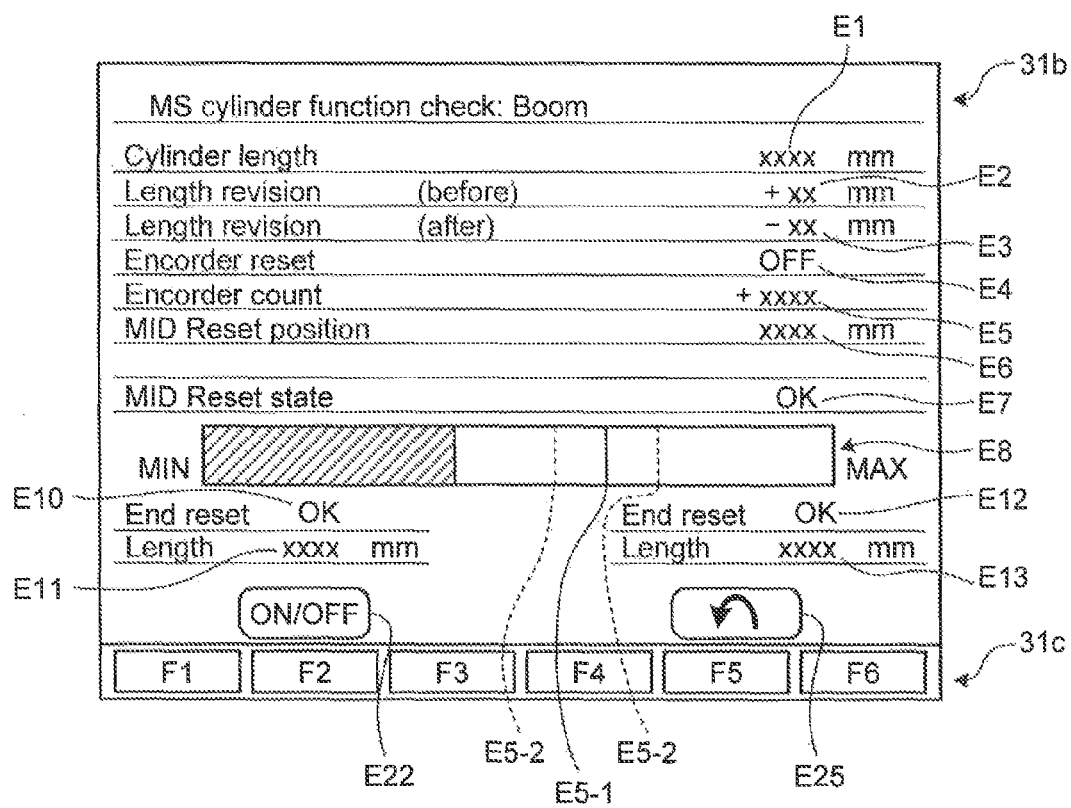
FIG. 10 is a diagram depicting an example of a stroke operation diagnosis support screen in a first embodiment, which is displayed in a display unit of a standard monitor.

The display unit 31b of the standard monitor 31 displays the measurement values of the stroke length by the stroke sensor 10 and the calibration state of the stroke length by the calibration process unit 30b. FIG. 10 depicts an example of the stroke operation diagnosis support screen on the display unit 31b. On the stroke operation diagnosis support screen, selecting the service menu, the inspection menu, and the cylinder inspection sequentially from the initial screen displays the selection menu of the boom cylinder, the arm cylinder, and the bucket cylinder, and FIG. 10 depicts the screen when the boom cylinder is selected.

In a region E1 of the stroke operation diagnosis support screen depicted in FIG. 10, the distance between the cylinder pins calculated based on the measurement results of the stroke sensor 10 is displayed in real time. The distance between the cylinder pins refers to the distance between an attachment pin PA on the minimum stroke end side at which the cylinder tube 4X depicted in FIG. 7 is rotatably attached to the vehicle main body 1a, and an attachment pin PB on the maximum stroke end side provided at one end of the cylinder rod 4Y to be rotatably attached to the boom cylinder 4f as the movable portion. The aforementioned stroke length is the stroke length L depicted in FIG. 7, and refers to the distance between the distance Lmin between the cylinder pins to the minimum stroke end position and the distance Lmax between the cylinder pins to the maximum stroke end position.

In regions E2 and E3 below the region E1, the correction value calibrated when the rotary encoder 20 is reset is displayed. For example, the difference L3 depicted in FIG. 7 is displayed. The region E3 displays the last correction value, and the region E2 displays the previous correction value before the last correction value. These correction values are updated every time the rotary encoder 20 is reset. The regions are not limited to the two regions E2 and E3 but may be three or more regions. Thus, the history of the correction values can be diagnosed.

A region E4 below the region E3 displays whether the reset of the rotary encoder 20 by the setting of the calibration invalidating setting unit 31e is in a valid state or an invalid state. While "ON" is displayed, the reset is in the valid state, and while "OFF" is displayed, the reset is in the invalid state. The default of this display is "ON". "ON" and "OFF" are switched by the toggle operation of the function key F2 at the bottom corresponding to a region E22 in the lower part of the screen. In this case, the function key F2 serves as the calibration invalidating setting unit 31e. The operation unit 31c is disposed at the lower part of the display unit 31b, and has six function keys F1 to F6. On the contrary, the function icons are displayed at the bottom of the screen that correspond to these function keys F1 to F6. For example, in this screen, a region E25 at the bottom of the screen corresponding to the function key F5 displays the icon representing the backward function. The operation unit 31c moreover has specific keys or a numeral keypad. Alternatively, the operation unit 31c may have keys independently of the standard monitor 31.

Moreover, a region E5 below the region E4 displays the count value of the rotary encoder 20 in real time. A region E6 below the region E5 displays the reference stroke length L2 detected at the initial calibration.

Moreover, a region E7 below the region E6 displays "OK" highlighted with a red color, for example, when the measurement stroke length is correctly calculated at other than the initial calibration. Note that "OK" disappears when the stroke starts to reverse.

A region E8 extending horizontally in a bar-like shape is provided below the region E7. The left end of the bar represents the minimum stroke end position while the right end of the bar represents the maximum stroke end position. Then, the stroke length corresponding to the value of the region E1 is changed according to the length of the bar and displayed. In other words, the region E8 displays the measurement value of the stroke length by the stroke sensor 10 in a bar graph, and displays graphically the continuous time change of the stroke. The reference stroke length L2 at the initial calibration is displayed at the position E5-1 on the bar graph, and the position E5-2 representing the range of the deviation of the stroke that is allowed from the position E5-1 is displayed on the bar graph.

Moreover, in a region E10 that is located at the lower left side of the region E8, "OK" that is highlighted with a red color, for example, is displayed in a manner similar to the region E7 when the reset at the minimum stroke end is carried out. In a region E12 that is located at the lower right side of the region E8, "OK" that is highlighted with a red color, for example, is displayed in a manner similar to the region E7 when the reset at the maximum stroke end is carried out. The highlighting of the region E10 and the region E12 is turned off when the stroke end state is over. Upon the reset, the sound is output from the notification unit 31$d$ in addition to highlighting the regions E7, E10, and E12.

Moreover, the regions E11 and E13 below the regions E10 and E12 display the distance between the cylinder pins at the minimum stroke end and the distance between the cylinder pins at the maximum stroke end that are obtained in advance.

Figure 11:
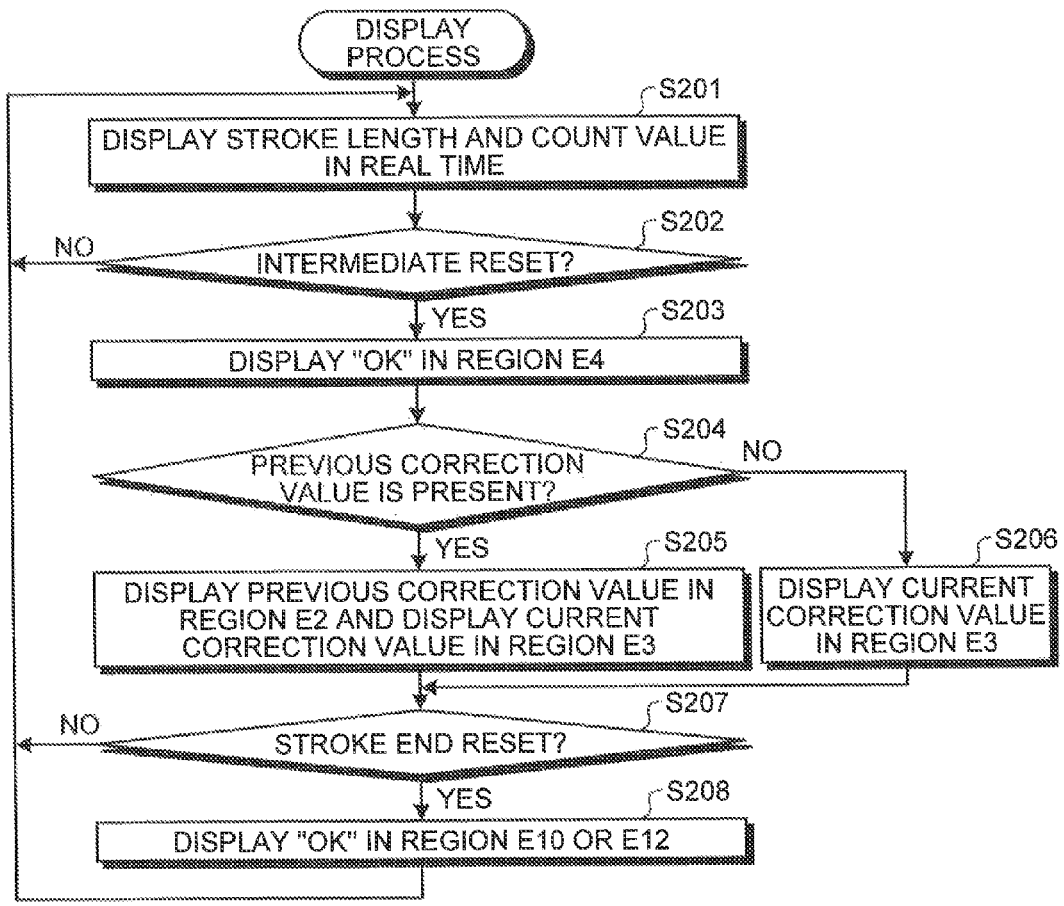
FIG. 11 is a flowchart depicting the procedure of a display process of the display unit of the standard monitor.

The outline of the display process of the aforementioned stroke operation diagnosis support screen is described with reference to the flowchart of FIG. 11. First, the standard monitor 31 acquires the current stroke length and the count value of the rotary encoder 20 from the measurement controller 30, and displays them in the regions E1 and E5 in real time and displays the bar graph in the region E8 in real time (Step S201). After that, whether the completion of the normal intermediate reset process has been not by the measurement controller 30 or not is determined (Step S202). If the intermediate reset has been normally done (Yes in Step S202), the region E4 displays "OK" (Step S203). Moreover, whether the previous correction value of the stroke length is stored or not is determined (Step S204). If the previous correction value is stored (Yes in Step S204), the region E2 displays the previous correction value and the region E3 displays the current correction value (Step S205); then, the process advances to Step S207. On the other hand, if the previous correction value is not stored (No in Step S204), the region E3 displays the current correction value (Step S206) and the process advances to Step S207.

After that, whether the stroke end reset has been normally done or not is determined (Step S207). If the stroke end reset has been normally done (Yes in Step S207) the corresponding regions E10 and E12 display "OK" (Step S208) and the process advances to Step S201; if the stroke end reset has not been normally done (No in Step S207), the process advances to Step S201.

Figure 12:
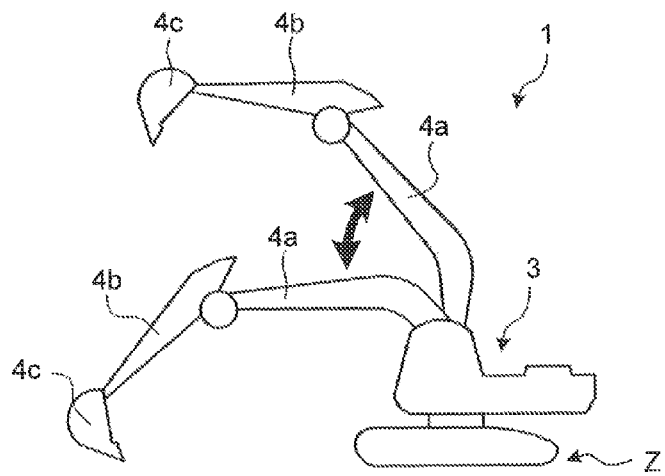
FIG. 12 is an explanatory view for describing the operation of the operation machine in the calibration process for the boom cylinder.
Figure 13:
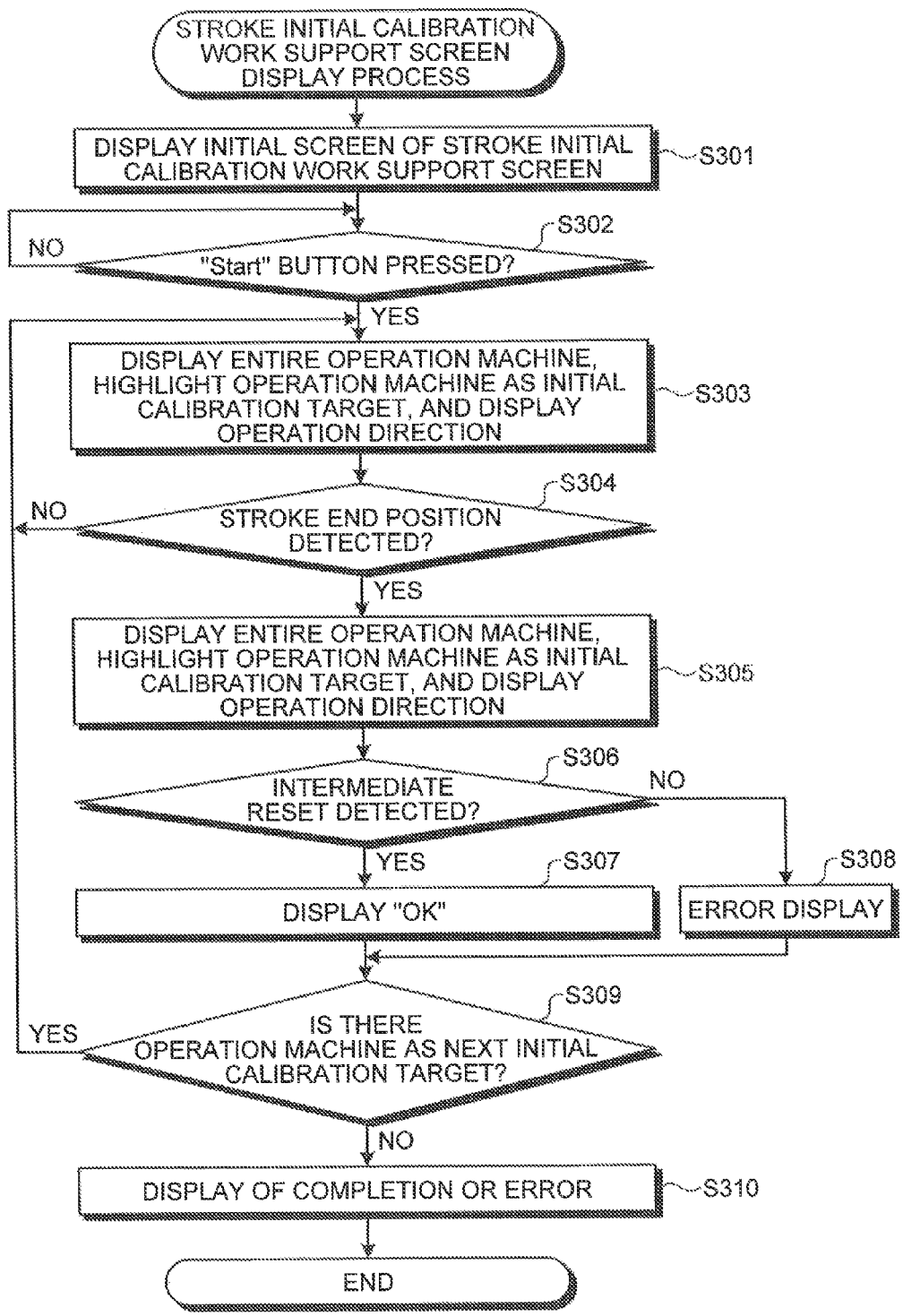
FIG. 13 is a flowchart depicting the procedure of a display process of a stroke initial calibration work support screen in a second embodiment, which is displayed in a display unit of an HMI monitor.

Moreover, description is specifically made of the diagnosis on the stroke operation diagnosis support screen when the boom 4$a$ is moved up and down. In this case, as depicted in FIG. 12, only the boom 4$a$ is moved up and down.

<Abnormality Check of Stroke Sensor>

First, since the default of the region E4 is "ON", the function key F2 is pressed long to turn it "OFF", thereby invalidating the reset by the rotary encoder 20. Then, the boom 4$a$ is moved up from the state where the bucket 4$c$ is installed.

In this case, due to the upward movement of the boom 4$a$, the stroke length reaches the maximum stroke end and during this operation, the region E1 displays the distance between the cylinder pins in real time. Upon the reach of the maximum stroke end, the stroke end reset is conducted and the region E2 displays the correction value. For example, if the correction value is not several millimeters, it is diagnosed that the slide has occurred in the stroke sensor 10. Moreover, since the region E8 graphically and continuously displays the change of the stroke length in the bar, it is possible to diagnose the operation state of the stroke sensor 10 depending on whether the bar display transits smoothly or not. Note that the reset by the rotary encoder 20 may remain in the valid state instead of being invalidated. However, the reset by the rotary encoder 20 can be invalidated by setting to the invalid state; thus, the graphical display in the region E8 can be diagnosed with the long stroke length. This eliminates the time and effort of diagnosis by disconnecting the connector of the rotary encoder 20, thereby enabling the efficient diagnosis.

<Abnormality Check of Rotary Encoder>

Whether the rotary encoder 20 is in trouble or not can be diagnosed by checking whether the count value of the rotary encoder 20 displayed in the region E5 changes or not or whether the Z-phase is input between the regions indicated, by the positions E5-1 and E5-2 to clear the count value of the rotary encoder 20.

<Reset Operation Check: Reset Operation by Stroke End>

Since the reset at the maximum stroke end is carried out in the region E12, the display of the highlighted "OK" and the notification of the reset enable the diagnosis that the reset at the maximum stroke end has been carried out normally. If neither the display of the highlighted "OK" nor the notification of the reset is carried out, it is possible to diagnose that the reset process of the stroke end is not conducted.

<Reset Operation Check: Reset Operation by Reset Sensor>

A moving-down operation for moving the boom 4$a$ down from the maximum stroke end is performed. In this case, the reset process by the rotary encoder 20 is diagnosed to be performed normally by confirming the display of the highlighted "OK" and the notification of the reset when the reset is conducted by the rotary encoder 20 in the region E7. If neither the display of the highlighted "OK" nor the notification of the reset is carried out it is possible to diagnose that the reset process of the rotary encoder 20 is not conducted and the rotary encoder 20 is in trouble.

According to the above structure, at least the measurement value of the stroke length obtained by the stroke sensor 10 and the calibration state obtained by the calibration process unit 30$b$ are displayed on the stroke operation diagnosis support screen; thus, the stroke operation can be diagnosed easily and simply.

In particular, since the continuous time change of the measurement value of the stroke length by the stroke sensor 10 is graphically displayed in the bar form, the slide operation of the stroke sensor can be specifically diagnosed.

Moreover, since the reset is prohibited until the stroke length has passed the reset reference point at the power input time, the first reset process can be conducted smoothly without notifying the error.

In addition, since the initial stroke value of the rotary encoder 20 at the power input time is set to the value out of the measurement range of the stroke length by the stroke sensor 10, it is possible to prevent the erroneous reset process due to the noise or the like before the first reset process, thereby enabling the first reset process to be performed normally.

Second Embodiment

In the first embodiment, the stroke operation can be diagnosed easily and simply by displaying the measurement value and the calibration state of the stroke length on the stroke operation diagnosis support screen for the hydraulic cylinder. In this second embodiment, the stroke initial operation calibration work support screen for the hydraulic cylinder is displayed in the display unit 33b of the HMI monitor 33, so that the initial calibration work is facilitated.

This initial calibration work is, as aforementioned, to enable the calculation and the storage of the reference stroke length L2 when the machine is shipped from the factory or the reset sensor is replaced by a new one. In the later operation of the operation machine, the calibration process is performed such as the reset of the stroke length based on the reference stroke length L2 which has been subjected to the initial calibration process. This initial calibration work has been performed by a service person using a check list or the like.

Here, description is made of the initial calibration work support performed based on an example of the stroke initial calibration work support screen illustrated in the flowchart of FIG. 13 and FIG. 14-1 to FIG. 14-10. First, on the stroke initial calibration work support screen, selecting the service menu on the initial screen and further selecting the initial calibration work menu displays the stroke initial calibration work support screen illustrated in FIG. 14-1 or FIG. 14-2 in the display unit 33b (Step S301).

Figures 1, 14:
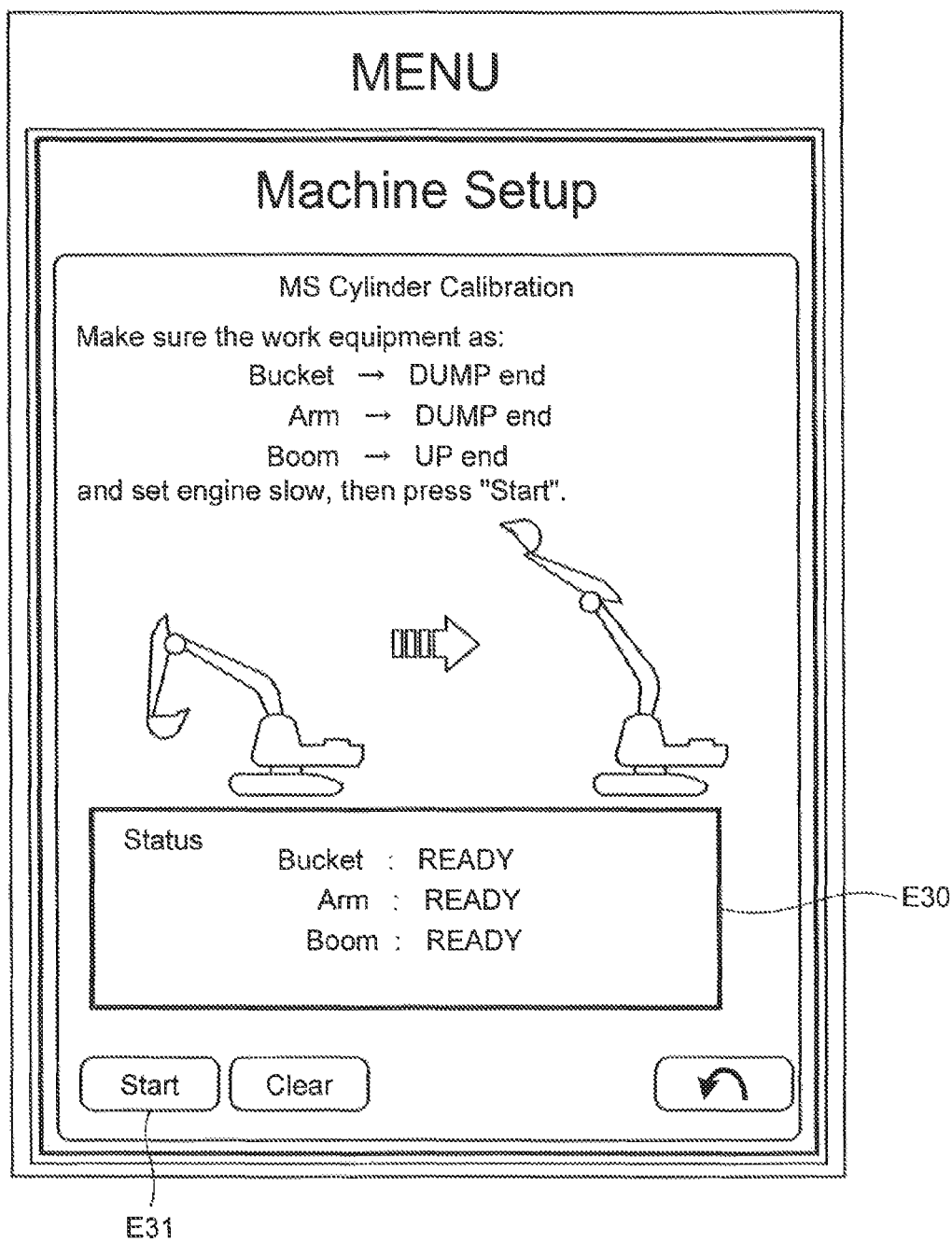
Figures 2, 14:
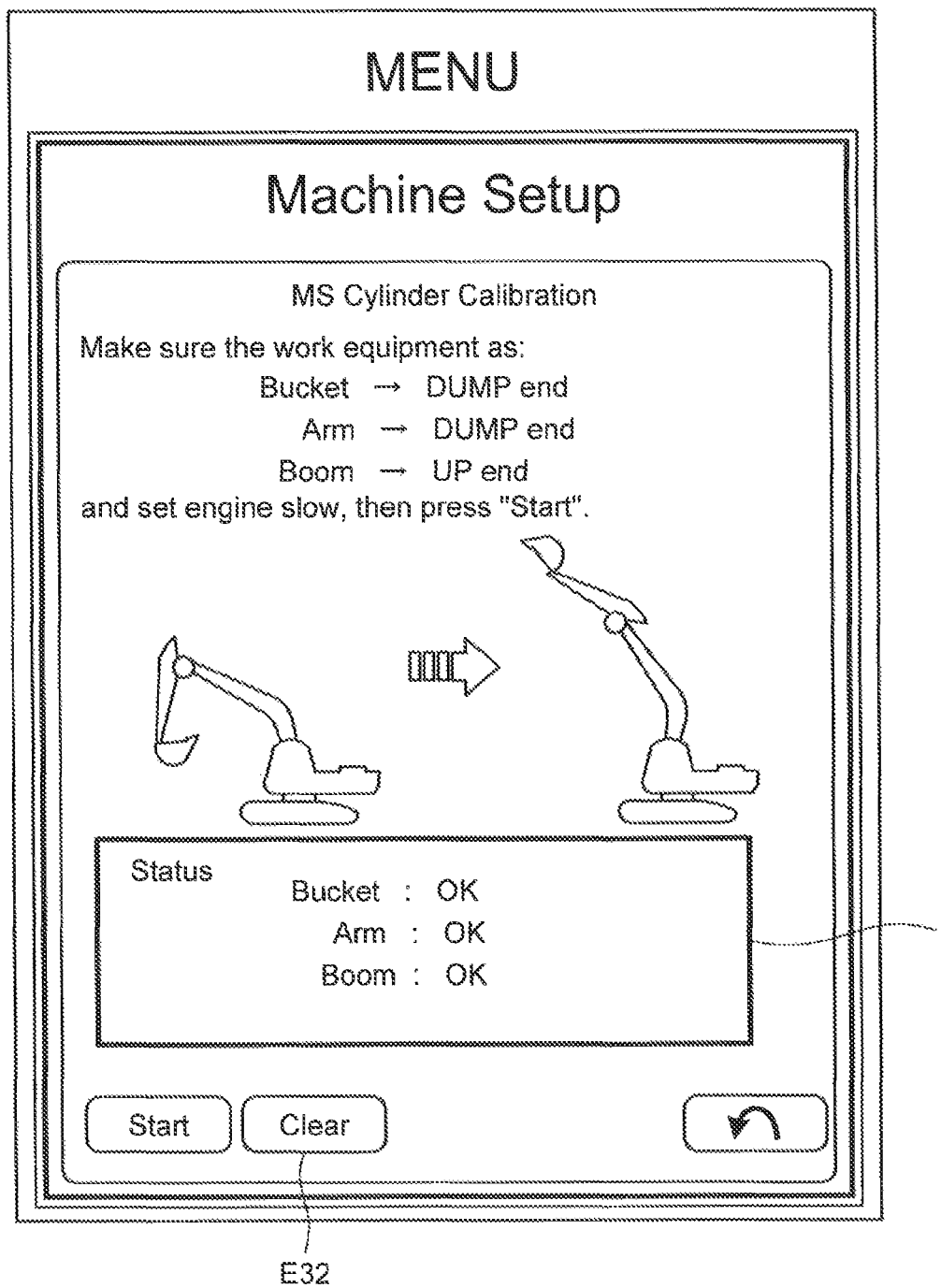
Figures 3, 14:
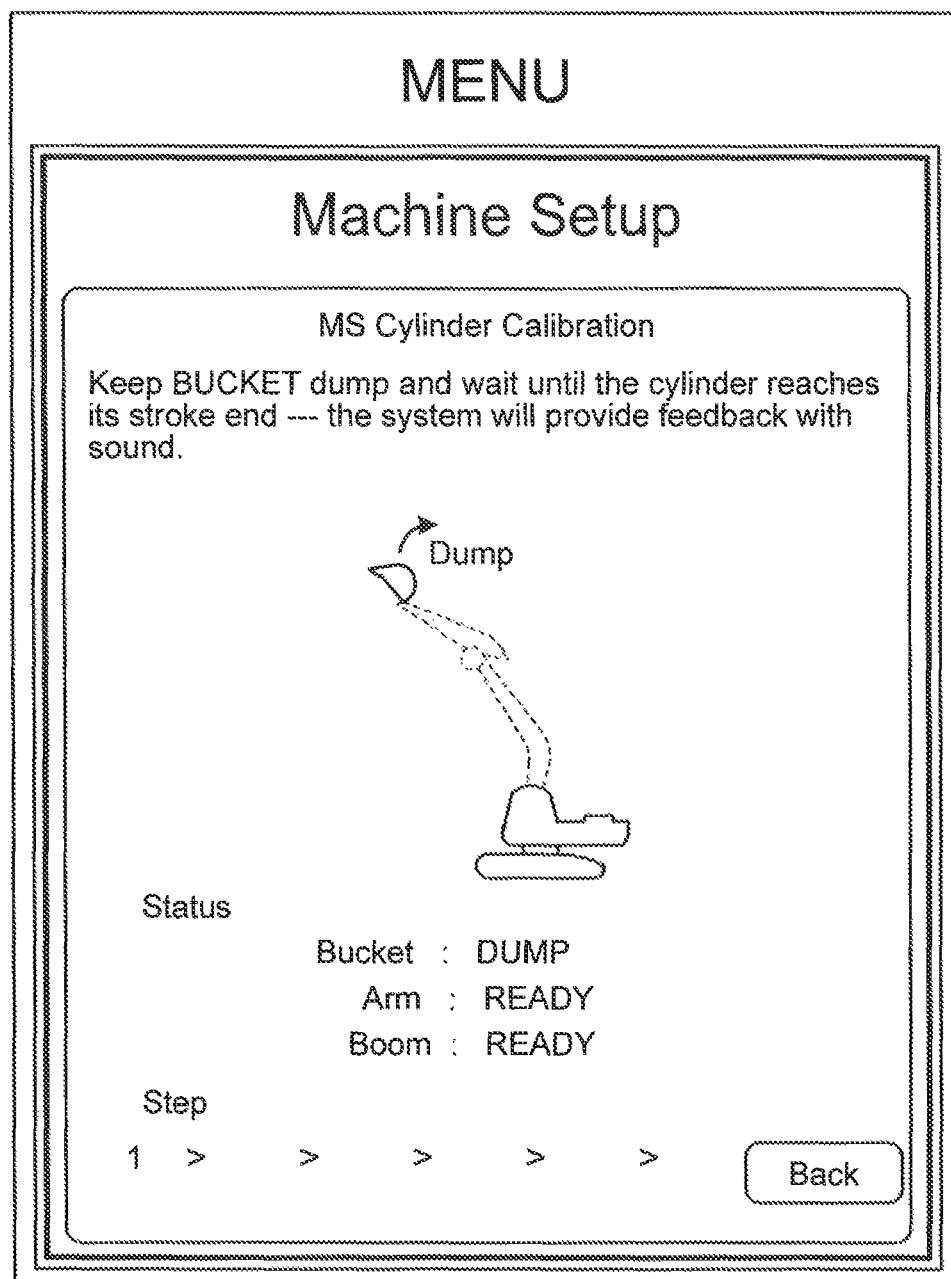
Figures 4, 14:
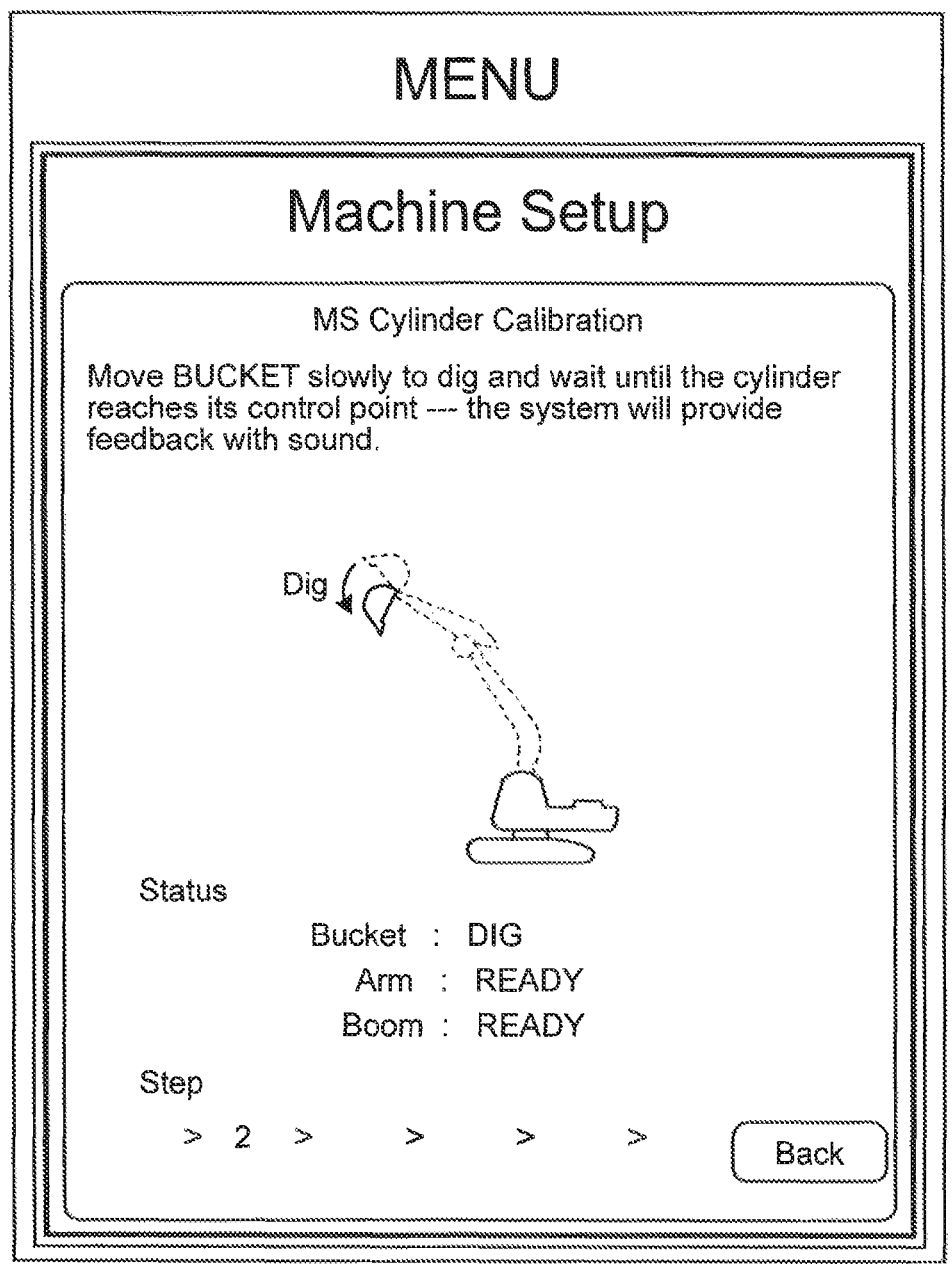
Figures 5, 14:
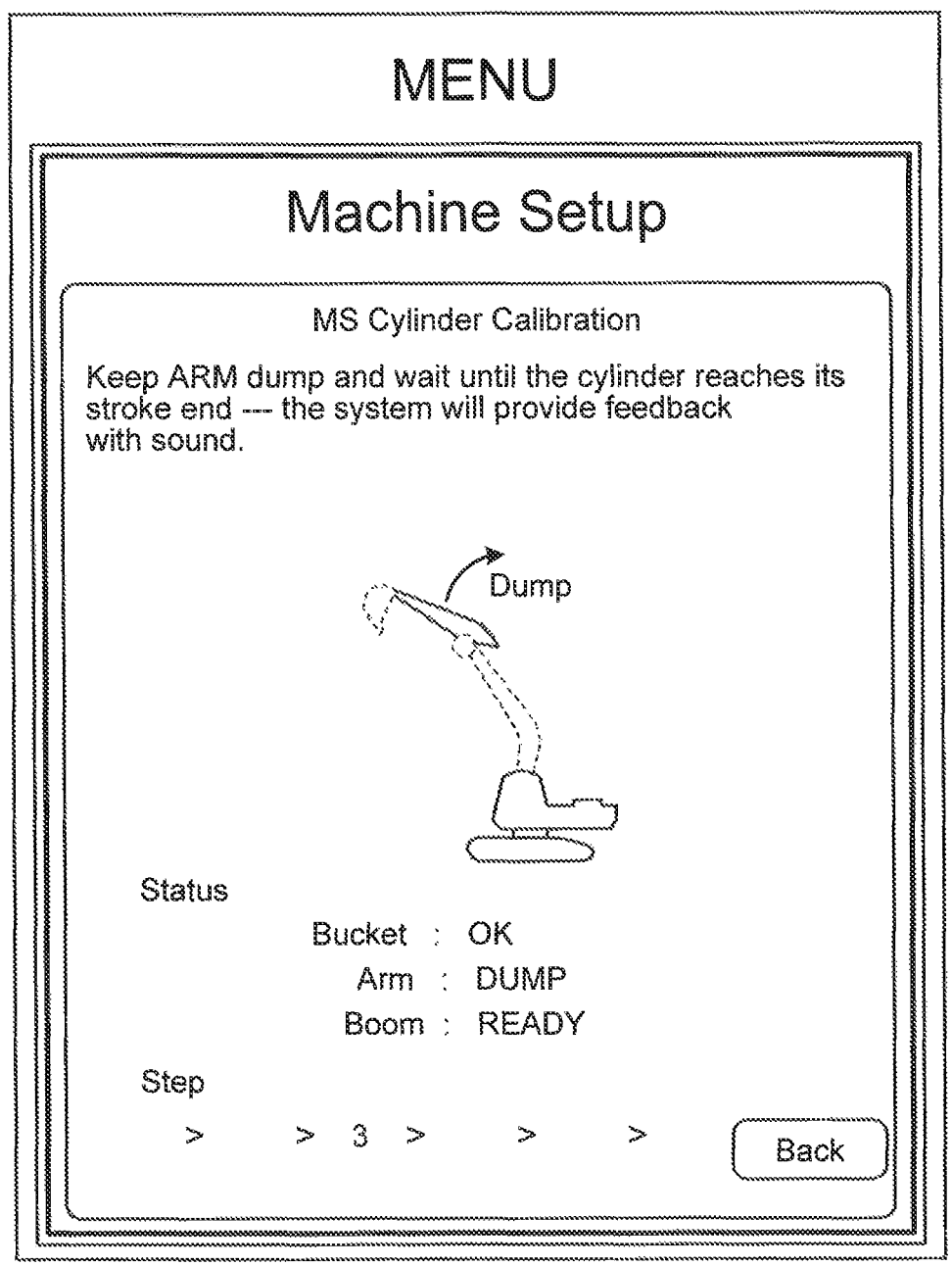
Figures 6, 14:
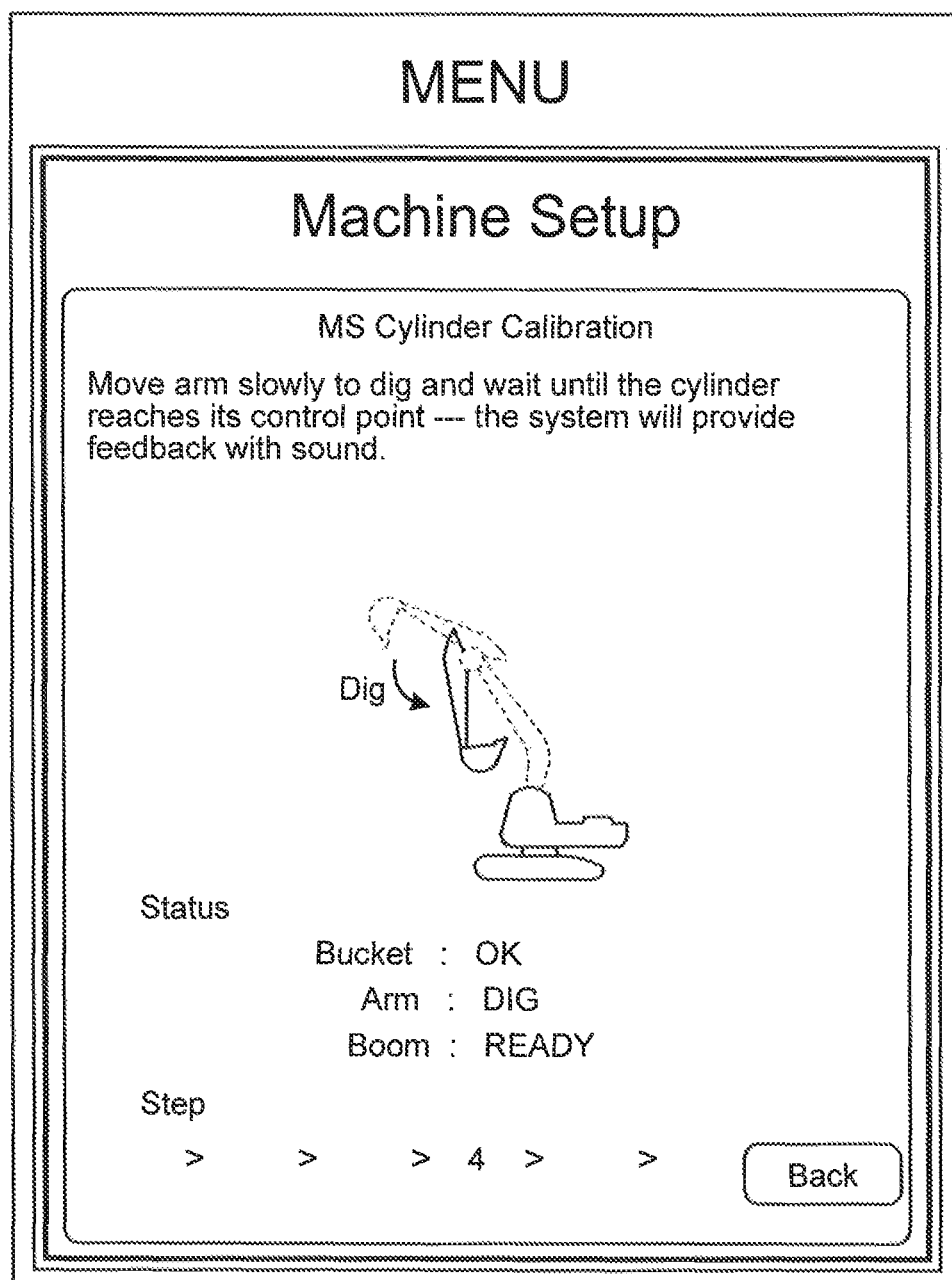
Figures 7, 14:
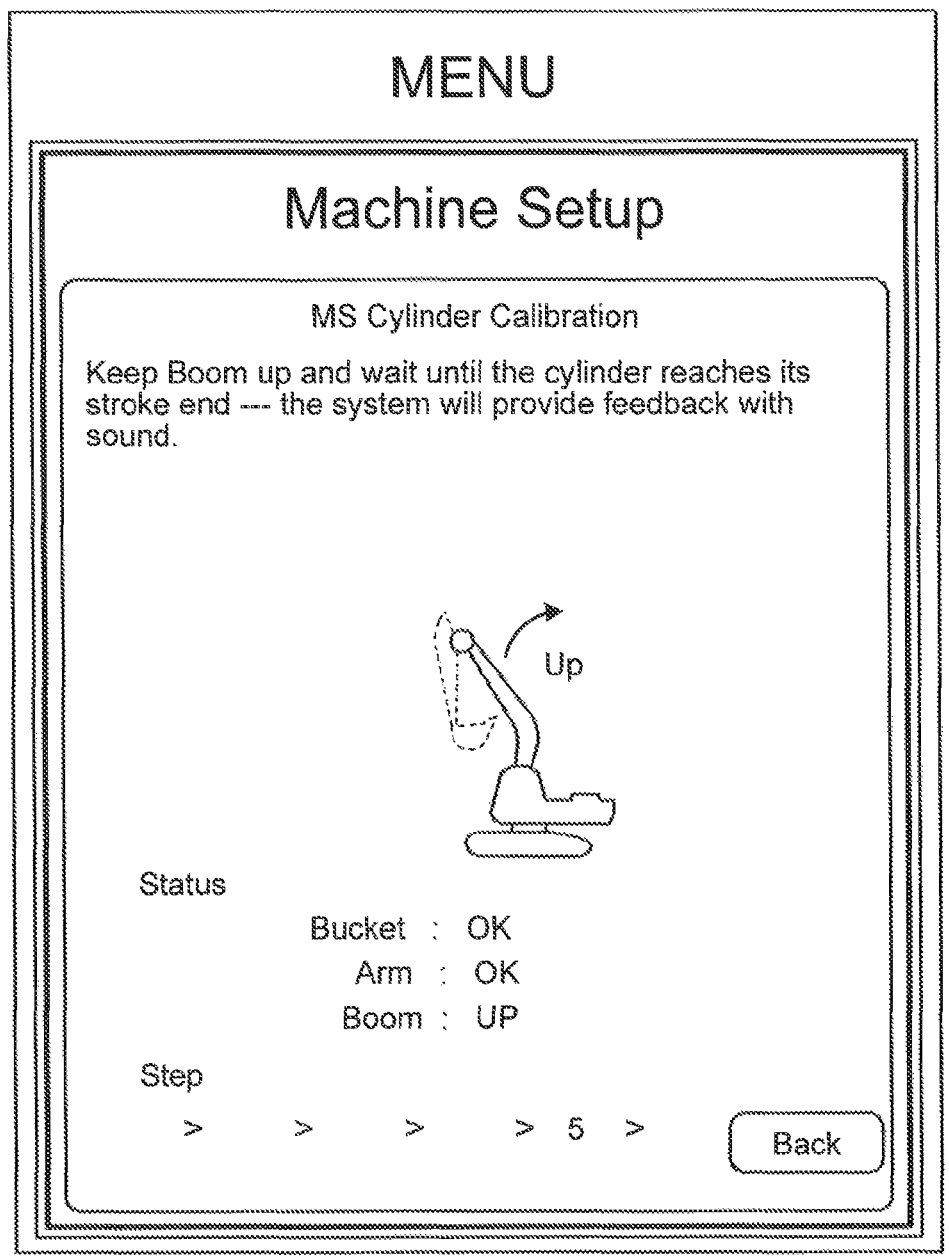
Figures 8, 14:
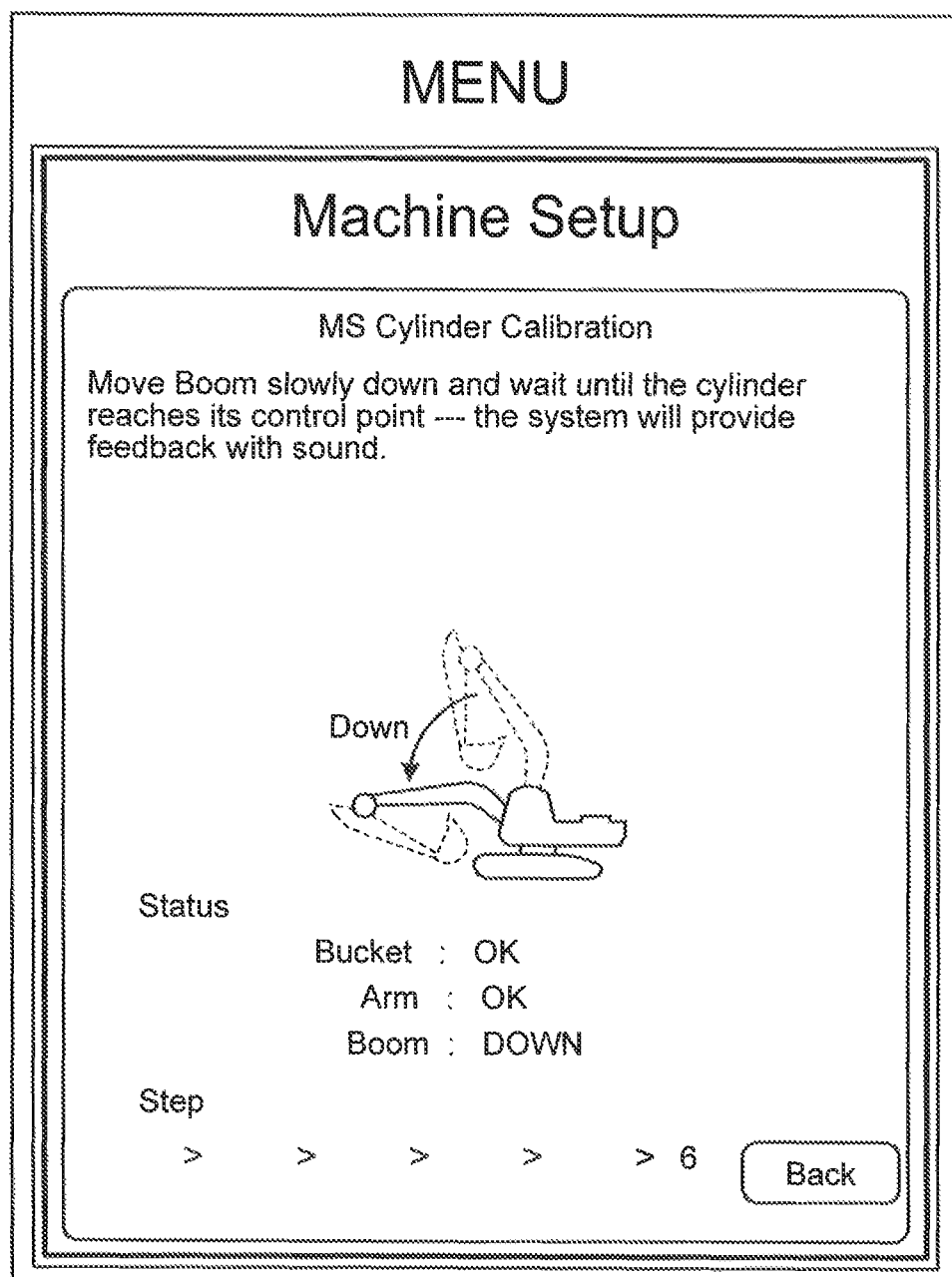
Figures 9, 14:
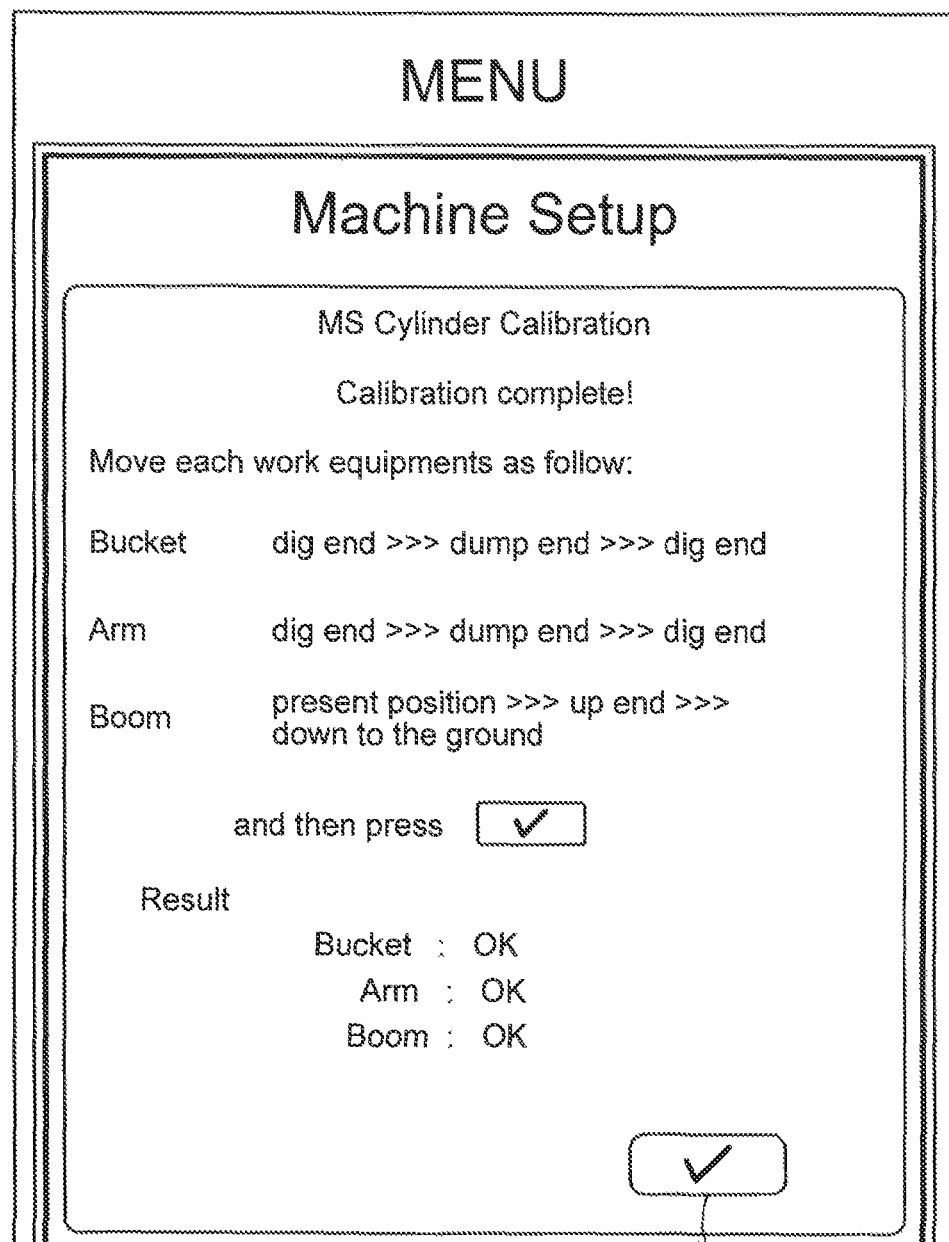
Figures 10, 14:
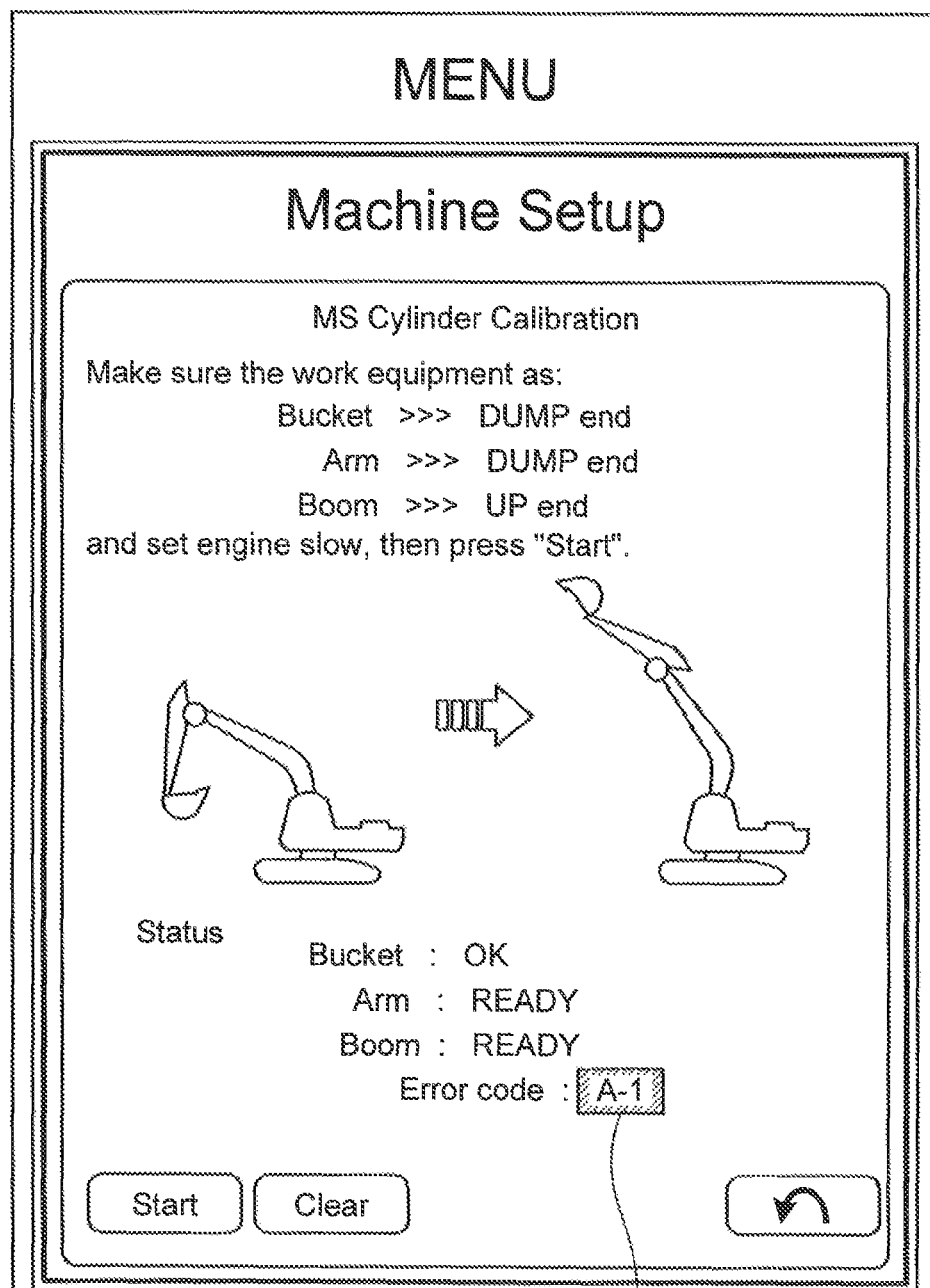

In the case where the initial calibration work of the hydraulic cylinder has not been carried out, the status of the initial calibration target is displayed as "READY" on the stroke initial calibration work support screen illustrated in FIG. 14-1. Meanwhile, in the case where the initial calibration work of the hydraulic cylinder has been carried out and the reference stroke length L2 has been written in the measurement controller 30, the status of the initial calibration target is displayed as "OK" on the stroke initial calibration work support screen illustrated in FIG. 14-2. Which to display between the screens of FIG. 14-1 and FIG. 14-2 is determined by the calculation unit 31a of the HMI monitor 33 based on the written state of the reference stroke length L2 in the measurement controller 30.

The screens illustrated in FIG. 14-1 and FIG. 14-2 display the outline of the operation for the hydraulic cylinder to be executed in the upper part of the screen, and also display the instruction for setting the engine slow and then pressing "Start". In the center of the screen, the posture of the entire excavator having the hydraulic cylinder mounted before the initial calibration work and the posture thereof at the initial calibration work are graphically displayed on the left side and the right side, respectively. In the lower part of the screen, a region E30 displays the status of the initial calibration work of each hydraulic cylinder. In the screen of FIG. 14-1, "READY" is displayed for each hydraulic cylinder because the initial calibration work has not been carried out. In the screen of FIG. 14-2, "OK" is displayed for each hydraulic cylinder because the initial calibration work has been carried out.

In the case of the display of the screen of FIG. 14-1, the screen transits to the stroke initial calibration work support screen illustrated in FIG. 14-3 by pressing long a button of "Start" in a region E31 for, for example, 0.5 seconds or more according to the displayed instruction (Step S302). On the other hand, in the case of performing the initial calibration work while the screen of FIG. 14-2 is displayed, the screen transits to the screen illustrated in FIG. 14-1 by pressing long a button of "Clear" in a region E32 for, for example, 0.5 seconds or more. In this case, the calculation unit 33a instructs the measurement controller 30 to reset the data of the reference stroke L2 currently written in. As a result, all the statuses in the region E30 are turned to "READY".

In the screen of FIG. 14-3, the highlighting process unit 33e graphically displays the entire posture of the excavator in the center of the screen and the bucket as the operation machine to be calibrated is highlighted; for example, the color or the tone of color of the bucket is changed so that the bucket can be identified from the other operation machines. Moreover, the highlighting process unit 33e displays the arrow that indicates the operation direction for this bucket (Step S303). Based on the work content displayed in the upper part of the screen and the graphical display, a service person operates the bucket lever in the direction of "DUMP" until the status of the bucket changes to "DIG". The lower part of this screen indicates that this work stage is Step 1. After that, upon the detection of the relief state after the bucket comes to the stroke end position in the "DUMP" direction (Yes in Step S304), the calculation unit 33a transits the screen to the screen of FIG. 14-4. Although the color of the operation machine as the calibration target is changed for the highlighting in the above description, the color or tone of color of another operation machine may be changed alternatively.

In the screen of FIG. 14-4, the highlighting process unit 33e graphically displays the entire posture of the excavator in the center of the screen and the bucket as the operation machine as the calibration target is highlighted; for example, the color or the tone of color of the bucket is changed so that the bucket can be identified from the other operation machines. Moreover, the highlighting process unit 33e displays the arrow that indicates the operation direction for this bucket (Step S305). Based on the work content displayed in the upper part of the screen and the graphical display, a service person slowly operates the bucket lever in the direction of "DIG" until the status of the bucket changes to "OK". The lower part of this screen indicates that this work stage is Step 2. When the calculation unit 33a has detected the reference stroke L2 in the operation of the bucket in the "DIG" direction (Yes in Step S306) and detected the relief state after the bucket reaches the stroke end position, the status of the bucket is displayed as "OK" (Step S307) and this reference stroke L2 is written in the measurement controller 30. After that, since there is the operation machine (arm) as the next initial calibration target (Yes in Step S309), the calculation unit 33a transits the screen to the screen of FIG. 14-5.

In the screen of FIG. 14-5, the highlighting process unit 33e graphically displays the entire posture of the excavator in the center of the screen and the arm as the operation machine to be calibrated is highlighted; for example, the color or the tone of color of the arm is changed so that the bucket can be identified from the other operation machines. Moreover, the highlighting process unit 33*e* displays the arrow that indicates the operation direction for this arm (Step S303). Based on the work content displayed in the upper part of the screen and the graphical display, a service person operates the arm lever in the direction of "DUMP" until the status of the arm changes to "DIG". The lower part of this screen indicates that this work stage is Step 3. When the calculation unit 33*a* has detected the relief state after the arm reaches the stroke end position in the "DUMP" direction (Yes in Step S304, the calculation unit 33*a* transits the screen to the screen of FIG. 14-6.

In the screen of FIG. 14-6, the highlighting process unit 33*e* graphically displays the entire posture of the excavator in the center of the screen and the arm as the operation machine to be calibrated is highlighted; for example, the color or the tone of color of the arm is changed so that the arm can be identified from the other operation machines. Moreover, the highlighting process an 33*e* displays the arrow that indicates the operation direction for this arm (Step S305). Based on the work content displayed in the upper part of the screen and the graphical display, a service person slowly operates the arm lever in the direction of "DIG" until the status of the arm changes to "OK". The lower part of this screen indicates that this work stage is Step 4. When the calculation unit 33*a* has detected the reference stroke length L2 in the operation of the arm toward the "DIG" direction (Yes in Step S306) and detected the relief state after the arm reaches the stroke end position, the status of the arm is displayed as "OK" (Step S307) and this reference stroke length L2 is written in the measurement controller 30. After that, since there is the operation machine (boom) as the next initial calibration target (Yes in Step S309), the calculation unit 33*a* transits the screen to the screen of FIG. 14-7.

In the screen of FIG. 14-7, the highlighting process unit 33*e* graphically displays the entire posture of the excavator in the center of the screen and the boom as the operation machine to be calibrated is highlighted; for example, the color or the tone of color of the boom is changed so that the boom can be identified from the other operation machines. Moreover, the highlighting process unit 33*e* displays the arrow that indicates the operation direction for this boom (Step S303). Based on the work content displayed in the upper part of the screen and the graphical display, a service person operates the boom lever in the direction of "UP" until the status of the boom changes to "DOWN". The lower part of this screen indicates that this work stage is Step 5. When the calculation unit 33*a* has detected the relief state after the boom reaches the stroke end position in the "UP" direction (Yes in Step S304), the calculation unit 33*a* transits the screen to the screen of FIG. 14-8.

In the screen of FIG. 14-8, the highlighting process unit 33*e* graphically displays the entire posture of the excavator in the center of the screen and the boom as the operation machine to be calibrated is highlighted; for example, the color or the tone of color of the boom is changed so that the boom can be identified from the other operation machines. Moreover, the highlighting process unit 33*e* displays the arrow that indicates the operation direction for this boom (Step S305). Based on the work content displayed in the upper part of the screen and the graphical display, a service person slowly operates the boom lever in the direction of "DOWN" until the operation machine touches the ground. The lower part of this screen indicates that this work stage is Step 6. When the calculation unit 33*a* has detected the reference stroke length L2 in the operation of the boom toward the "DOWN" direction (Yes in Step S306), the status of the boom is displayed as "OK" (Step S307) and this reference stroke length L2 is written in the measurement controller 30. After that, since there is no operation machine as the next initial calibration target (No in Step S309), the calculation unit 33*a* transits the screen to the screen of FIG. 14-9.

Figure 9:
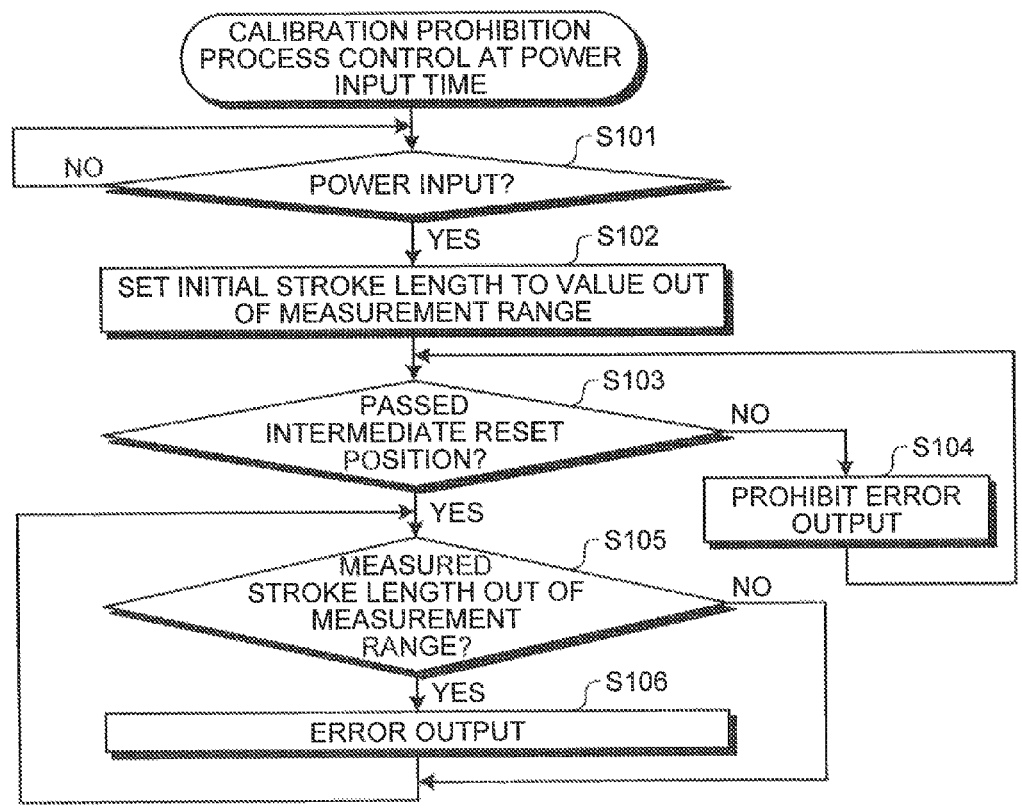
FIG. 9 is a flowchart depicting the procedure of control of a calibration prohibition process at the power input time.

The screen of FIG. 14-9 displays that all of the statuses of the hydraulic cylinders are "OK" and displays that the initial calibration work has been completed (Step S310). Moreover, the bucket, the arm, and the boom are reciprocated and the reset position is recognized; by pressing the check button in the region E33 after this reciprocation, the initial calibration work is completed. Then, the calculation unit 33*a* conducts the process for returning to the menu screen.

The procedure of the aforementioned initial calibration work is in the order of the bucket, the arm, and the boom; however, the present invention is not limited thereto. For example, in the case of carrying out the initial calibration work for the arm, the initial calibration work for the arm ends. Then, independently of the procedure of the initial calibration work, the initial calibration work for another calibration target is carried out; after the initial calibration work for all the hydraulic cylinders ends, the screen display illustrated in FIG. 14-9 is obtained.

If the calibration of the calibration target has failed (No in Step S306), the screen transits to the screen of FIG. 14-10. Then, the calculation unit 33*a* displays an error code in a region E34 (Step S308). This notifies the content of the error and how to release the error. The content of the error and how to release the error may be displayed automatically upon the display of the error code. If the calibration of the calibration target has failed, the reference stroke length L2 is not updated and the currently stored reference stroke length L2 is held.

If the initial calibration work of the hydraulic cylinder is not finished yet, the calculation unit 33*a* issues an alert via the notification unit 33*d* to call the person's attention. The calculation unit 33*a* determines whether the initial calibration work is finished yet based on whether the reference stroke length L2 is entirely written in the measurement controller 30.

If the HMI monitor 33 can receive the information from the communication satellite via the position information detection device 19 and the antenna 9, the position information detection device 19 calculates the position and the direction of the excavator 1 on the basis of the received position information and then outputs the information as the vehicle position information to the main controller 32 and the HMI monitor 33. Meanwhile, the work position information related to the horizontal and vertical position of the edge of the blade of the operation machine 4 is acquired by the measurement controller 30 and output to the main controller 32 and the HMI monitor 33. The main controller 32 and the HMI monitor 33 can automatically control the edge of the blade of the operation machine 4 on the basis of the vehicle position information and the work position information and moreover the three-dimensional work information. In the occurrence of the communication error between the main controller 32 and the HMI monitor 33 in the initial calibration work, the error screen pops up on the display screen. In this case, the initial calibration process is cancelled by pressing the button corresponding to "back" on the popped error screen, thereby returning to the menu screen. In this case, the initial calibration work is conducted using the stroke initial calibration work support screen again after the error is released.

In this second embodiment, the calculation unit 33a of the HMI monitor 33 transits the stroke initial calibration work support screen on the basis of the detection of the operation state of the operation machine and the input of the operation unit 33c, and moreover has the reference stroke length L2 as the calibration result written in and furthermore controls to display the error screen. As a result, a service person can operate the operation machine according to the stroke initial calibration work support screen and can complete the initial calibration work just by performing the simple input through the operation unit 33c.

In the aforementioned first, and second embodiments, it is preferable to perform the reset process by the reset sensor or the reset process at the stroke end not in both stroke directions but in only one stroke direction. This is because, in the former case, the reset position has the directivity and the reset needs to be processed for every direction, thereby complicating the process. For example, the bucket cylinder 4d and the arm cylinder 4e are reset only in the cylinder extending direction and the boom cylinder 4f is reset only in the cylinder contracting direction. The boom cylinder 4f is reset only in the cylinder contracting direction because at the stroke end on the contraction side of the boom cylinder 4f, the operation machine is located below the ground level and therefore cannot be used generally. In the second embodiment, the HMI monitor 33 displays the initial calibration work support screen; however, the standard monitor 31 may alternatively display the initial calibration work support screen.

REFERENCE SIGNS LIST

1 EXCAVATOR
1a VEHICLE MAIN BODY
2 LOWER RUNNING BODY
2a CATERPILLAR TRACK
3 UPPER SWINGING BODY
3a ENGINE
4 OPERATION MACHINE
4a BOOM
4b ARM
4c BUCKET
4d BUCKET CYLINDER
4e ARM CYLINDER
4f BOOM CYLINDER
4X CYLINDER TUBE
4W CYLINDER HEAD
4Y CYLINDER ROD
4V PISTON
5 CAB
6 ENGINE ROOM
7 COUNTER WEIGHT
8 DRIVER'S SEAT
9 ANTENNA
10 STROKE SENSOR
11 ROTARY ROLLER
12 ROTATION CENTER SHAFT
13 ROTATION SENSOR UNIT
13a MAGNET
13b HALL IC
14 CASE
19 POSITION INFORMATION DETECTION DEVICE
20 ROTARY ENCODER
20a MAGNETIC SENSOR
25 DISK-SHAPED PORTION
25a, 25b TRANSMISSION PORTION
26 LIGHT EMISSION UNIT
27 LIGHT RECEPTION UNIT
27a LIGHT RECEPTION ELEMENT
30 MEASUREMENT CONTROLLER
30a STROKE END DETECTION PROCESS UNIT
30b CALIBRATION PROCESS UNIT
30c MALFUNCTION DETECTION PROCESS UNIT
31 STANDARD MONITOR
31a, 33a CALCULATION UNIT
31b, 33b DISPLAY UNIT
31c, 33c OPERATION UNIT
31d, 33d NOTIFICATION UNIT
31e CALIBRATION INVALIDATING SETTING UNIT
32 MAIN CONTROLLER
33 HMI MONITOR
33e HIGHLIGHTING PROCESS UNIT
40H ROD-SIDE OIL CHAMBER
40B CAP-SIDE OIL CHAMBER
61 MAGNETIC SENSOR
63 MAGNET
101, 101R, 101L OPERATION LEVER DEVICE
101Ra, 101Rb OPERATION LEVER
101Rb, 101Lb DETECTION UNIT
102 CONTROL VALVE
103 HYDRAULIC PUMP
103a SWASH PLATE
104 SERVO MECHANISM
105 ENGINE DRIVING MECHANISM
106 DISCHARGE OIL PASSAGE
107, 108 OIL PASSAGE
109 BATTERY
110 ENGINE KEY SWITCH
d ROTATION RADIUS
E1-E8, E10, E12, E22, E30-E34 REGION
F1, F2, F5 FUNCTION KEY
L STROKE LENGTH
L1 MEASUREMENT STROKE LENGTH
L2 REFERENCE STROKE LENGTH
L3 DIFFERENCE
N NETWORK
PA, PB ATTACHMENT PIN

The invention claimed is:
1. A stroke operation calibration control device for a hydraulic cylinder, the stroke operation calibration control device comprising:
movable portions sequentially supported rotatably to a vehicle main body;
hydraulic cylinders each disposed between the vehicle main body and the movable portion or between the movable portions and rotatably supporting the movable portions;
a stroke sensor provided for the hydraulic cylinder and measuring a stroke length of the hydraulic cylinder;
a reset sensor measuring a reset reference point at which the stroke length measured by the stroke sensor is reset;
a stroke end detection process unit detecting a stroke end position of the hydraulic cylinder;
a calibration process unit calibrating the stroke length upon the detection of the reset reference point and/or the stroke end position;
a malfunction detection unit outputting an error when the stroke length is out of a stroke range defined by a minimum stroke end position and a maximum stroke end position; and a control unit prohibiting the output of the error until the stroke length has passed the reset reference point at power input time.

2. The stroke operation calibration control device for a hydraulic cylinder according to claim 1, wherein the reset sensor is a rotary encoder, and an initial stroke value of the rotary encoder at power input time is set to a value out of the stroke range.

3. A stroke operation calibration control method for a hydraulic cylinder, comprising the steps of:

measuring a stroke length of a hydraulic cylinder by a stroke sensor provided for the hydraulic cylinder;

detecting a reset reference point by a reset sensor; and calibrating the stroke length, wherein at power input time, prohibiting a reset until the stroke length has passed the reset reference point, and prohibiting an output of an error even if the stroke length is out of a stroke range defined by a minimum stroke end position and a maximum stroke end position.

4. The stroke operation calibration control method for a hydraulic cylinder according to claim 3, wherein the reset sensor is a rotary encoder, and an initial stroke value of the rotary encoder at the power input time is set to a value out of a stroke end range out of the stroke range.

* * * * *